(12) United States Patent
Kakigi

(10) Patent No.: US 8,345,332 B2
(45) Date of Patent: Jan. 1, 2013

(54) IMAGE PROCESSING SYSTEM, IMAGE PROCESSING APPARATUS, AND IMAGE PROCESSING METHOD

(75) Inventor: Nobuyoshi Kakigi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 980 days.

(21) Appl. No.: 12/394,567

(22) Filed: Feb. 27, 2009

(65) Prior Publication Data

US 2009/0225339 A1   Sep. 10, 2009

(30) Foreign Application Priority Data

Mar. 4, 2008   (JP) ................................ 2008-053909

(51) Int. Cl.
*G03F 3/08* (2006.01)
*G06F 3/12* (2006.01)
*G06F 15/00* (2006.01)
*G06K 1/00* (2006.01)
*H04N 1/46* (2006.01)

(52) U.S. Cl. ........ 358/518; 358/1.9; 358/1.15; 358/501; 358/504

(58) Field of Classification Search .......... 358/1.6, 358/2.1, 3.23, 3.27, 1.13, 1.15, 1.18, 501, 358/504, 1.9, 518
See application file for complete search history.

(56) References Cited

U.S. PATENT DOCUMENTS 6,738,151 B1 * 5/2004 Kato ............................. 358/1.12
6,922,266 B2 * 7/2005 Hiramatsu ..................... 358/518
7,158,260 B2 * 1/2007 Takemoto ...................... 358/1.9
7,453,602 B2 * 11/2008 Shimada ........................ 358/1.9
7,495,786 B2 * 2/2009 Sugiura et al. ............... 358/1.13
7,864,371 B2 * 1/2011 Shirasawa ..................... 358/1.9
7,961,352 B2 * 6/2011 Kaneko et al. ................ 358/1.9

FOREIGN PATENT DOCUMENTS

JP   10-079865   3/1998

* cited by examiner

*Primary Examiner* — Twyler Haskins
*Assistant Examiner* — Jonathan Beckley
(74) *Attorney, Agent, or Firm* — Fitzpatrick, Cella, Harper & Scinto

(57) ABSTRACT

To provide an image processing system, an image processing apparatus, and an image processing method capable of realizing the optimum color matching between apparatuses according to various situations (the use case or the type of image) in printing one job in a plurality of image forming apparatuses. In the present invention, MFP101 acquires a color reproduction range for each of MFP102 and LBP103 (Step S903), and computes logical AND of the plurality of acquired color reproduction ranges (Step S904). Next, in accordance with the use case and the attribute of an image, MFP101 determines whether the color reproduction range in printing the image is set to the logical AND of the color reproduction ranges or to an expanded area of the logical AND of the color reproduction ranges (steps S905 to S908). Then, MFP101 adds the determined color reproduction range to the image and transmits this to MFP102, LBP103 (S909).

22 Claims, 15 Drawing Sheets

[USE CASE]

| CASCADE | 5 |
| DISTRIBUTION | 4 |
| SINGLE | 0 |

| TEXT | 4 |
| GRAPHIC | 2 |
| IMAGE | 1 |

[COLOR MATCHING LEVEL]

※PRIORITY IS GIVEN TO COLOR MATCHING BETWEEN DEVICES
※COLOR MATCHING BETWEEN DEVICES IS PERFORMED MODERATELY
※COLOR MATCHING BETWEEN DEVICES IS NOT PERFORMED

HIGH: NOT LESS THAN 8 POINTS
MIDDLE: FROM 4 TO 7 POINTS
LOW: NOT MORE THAN 3 POINTS

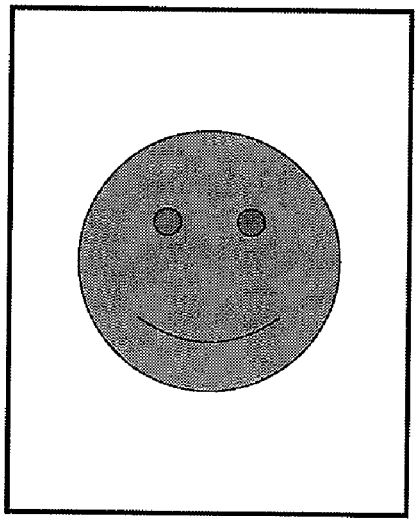
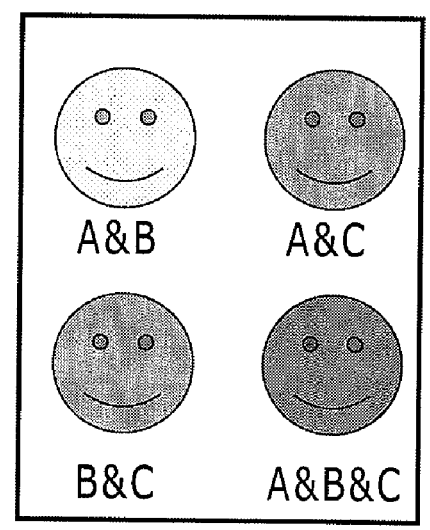
FIG.13A
FIG.13B

IMAGE PROCESSING SYSTEM, IMAGE PROCESSING APPARATUS, AND IMAGE PROCESSING METHOD

BACKGROUND OF THE INVENTION

1. Field of the Invention

The present invention relates to an image processing system, an image processing apparatus, and an image processing method, and in particular relates to an image processing system, an image processing apparatus, and an image processing method for printing one job in a plurality of printing apparatuses.

2. Description of the Related Art

There is a technique called cascade copy or cascade print for distributing and transmitting a job to a plurality of printing apparatuses and performing printing in the printing apparatuses. This technique can increase the productivity in copying or in print processing from a PC. In printing one job in a plurality of printing apparatuses with this cascade copy or cascade print, if the printing is performed between printing apparatuses having different color reproduction capabilities, there has been a problem in that the results (particularly tint) printed in the respective printing apparatuses may differ from each other. The difference in tint of the printed material for each printing apparatus is not preferable because the printed material will be output with a different tint for each printing apparatus for each color, particularly in performing color printing. For this reason, the typical system has such a specification that cascade copy or cascade print can be performed only when the color reproduction capability of each printing apparatus is the same.

In order to solve these problems, Japanese Patent Laid-Open No. H10-79865 (1998) discloses that the data converted to PCS (Profile Connection Space) color data independent of printing apparatuses is mapped within a common color reproduction area of printing apparatuses as output destinations. That is, in Japanese Patent Laid-Open No. H10-79865 (1998), the data converted to PCS color data is mapped within a common color reproduction area where a first color reproduction range and a second color reproduction area overlap with each other using an identical color reproduction profile. In Japanese Patent Laid-Open No. H10-79865 (1998), the tints of the outputs of the printing apparatuses having different color reproduction capabilities are adjusted using such a mapping technique.

Since the technique disclosed in Japanese Patent Laid-Open No. H10-79865 (1998) uses the above-described common color reproduction area, an output with the same tint can be obtained in the different types of apparatuses and accordingly this technique has been an effective technique and satisfied demands in those days. However, in recent years, there is a desire to excellently perform printing in accordance with various situations (various use cases or various types of images) between different printing apparatuses, and therefore there still remains a problem in order to perform excellent printing.

For example, among the above-described various situations, the use cases of printing one job in a plurality of printing apparatuses include not only cascade copy performed for improving the productivity but also various use cases. For example, scan image distribution for distributing the scanned data of meeting minutes or the like from a meeting room to printing apparatuses near participants, distribution print for delivering a FAX or PDL data to a floor of each department, and the like correspond to the various use cases. For example, the scan image distribution can transfer the minutes or memos written on a white board during a meeting to output apparatuses near the participants just by making one print without printing as many prints as the number of the participants. Therefore, the scan image distribution is a convenient function to eliminate a need to wait for all the prints to be output and also eliminate a need to carry them. Moreover, the distribution print is a function to transmit data for printing to a plurality of output apparatuses simultaneously, and is intended to distribute the same information to a plurality of persons at separate locations. The distribution print is a convenient function to transfer, for example, a FAX received in an MFP with a facsimile function to a plurality of printers, which are registered to be transferred in advance, thereby allowing even a printer without a facsimile function to receive the FAX and allowing a nearby output apparatus in an office to receive the FAX. Depending on differences in these use cases, the importance of tint matching of the output in each printing apparatus will vary. For example, since the purpose of the cascade copy or the cascade print is to improve the productivity, one person is most likely to have the output results and thus the importance of matching the tints in the outputs of printing apparatuses becomes high. On the other hand, in the scan image distribution or the distribution print, since separate users are supposed to have the printed material, the tint matching in the outputs of printing apparatuses is not so important.

Moreover, in printing the same content, the importance of the tint matching between the printing apparatuses varies also depending on the content of a printing job. For example, in the case of image data, a wide variety of colors are often used, and if the printing is performed in a condition of a narrow color reproduction range, the vividness of each color will degrade and differences from the document image become conspicuous. On the other hand, a text image is primarily black and the colors to be used are also often limited, and furthermore, unlike a picture image, color variation in the text image is also often monotonous. Accordingly, the text image is characterized in that even if the printing is performed in a condition of a narrow color reproduction range, the differences from the document image are inconspicuous.

However, in Japanese Patent Laid-Open No. H10-79865 (1998), the "use case" such as cascade or distribution, or the "type of image" such as text, graphic, or image, has not been taken into account. For this reason, the optimum color matching between devices corresponding to the applications or the features of an image that change visual impression to a user cannot be performed, thus resulting in processing of uniformly emphasizing only color matching between devices. For example, also in delivering picture images, there is a problem that the color matching between devices and the color matching with a document cannot be processed in a balanced manner, and thus differences from the document image become conspicuous.

Furthermore, a user may desire to vibrantly output a specific color depending on not only the type of a document image but the color range used in the document image or the drawn contents, or a user may desire to output in such a manner that differences between printing apparatuses may become inconspicuous. However, such customization cannot be specified.

The present invention has been made in order to solve the above-described problems. It is an object of the present invention to provide an image processing system, an image processing apparatus, and an image processing method capable of realizing the optimum color matching between devices depending on various situations (the use case or the type of image) in printing one job in a plurality of image forming apparatuses.

Furthermore, it is another object of the present invention to provide an image processing system, an image processing apparatus, and an image processing method capable of making the optimum selection of the levels of color matching between devices, color matching methods, and image forming apparatuses to be used, and also capable of easily customizing to meet user's needs.

SUMMARY OF THE INVENTION

In order to achieve such objectives, according to an aspect of the present invention, an image processing system comprises an image processing apparatus and a plurality of image forming apparatuses, the image processing system being capable of printing an identical image in the plurality of image forming apparatuses, wherein the image processing apparatus includes: a unit acquiring a color reproduction range of each of the plurality of image forming apparatuses from each of the plurality of image forming apparatuses; a unit computing logical AND of the plurality of acquired color reproduction ranges; a unit determining whether a color reproduction range in printing the image is set to the logical AND of the plurality of color reproduction ranges or to an expanded area of the logical AND of the plurality of color reproduction ranges, in accordance with at least one of a use case indicating whether print using the plurality of image forming apparatuses is cascade print or distribution print and an attribute of the image; and a unit adding the determined color reproduction range to the image and transmitting this to the plurality of image forming apparatuses, and wherein the image forming apparatus includes: a unit, upon receipt of a request to acquire a color reproduction range inherent to the image forming apparatus from the image processing apparatus, generating the inherent color reproduction range and transmitting this for response to the image processing apparatus; and a unit, upon receipt of the image added with the determined color reproduction range from the image processing apparatus, compressing the image for printing so as to fall within the determined color reproduction range.

According to the present invention, in printing one image (job) in a plurality of image forming apparatuses to which the image is transferred, the optimum color matching between the image forming apparatuses can be realized in accordance with at least one of a use case indicating whether the printing is cascade print or distribution print and the attribute of the image.

Furthermore, the optimum selection of the levels of color matching between the image forming apparatuses to which the image is transferred, the color matching methods, and the image forming apparatuses to be used can be performed and the customization to meet user's needs can be easily performed.

Further features of the present invention will become apparent from the following description of exemplary embodiments with reference to the attached drawings.

BRIEF DESCRIPTION OF THE DRAWINGS

FIGS. 13A and 13B are views showing output examples of a sample print in a third embodiment of the present invention;

DESCRIPTION OF THE EMBODIMENTS

Figure 1:
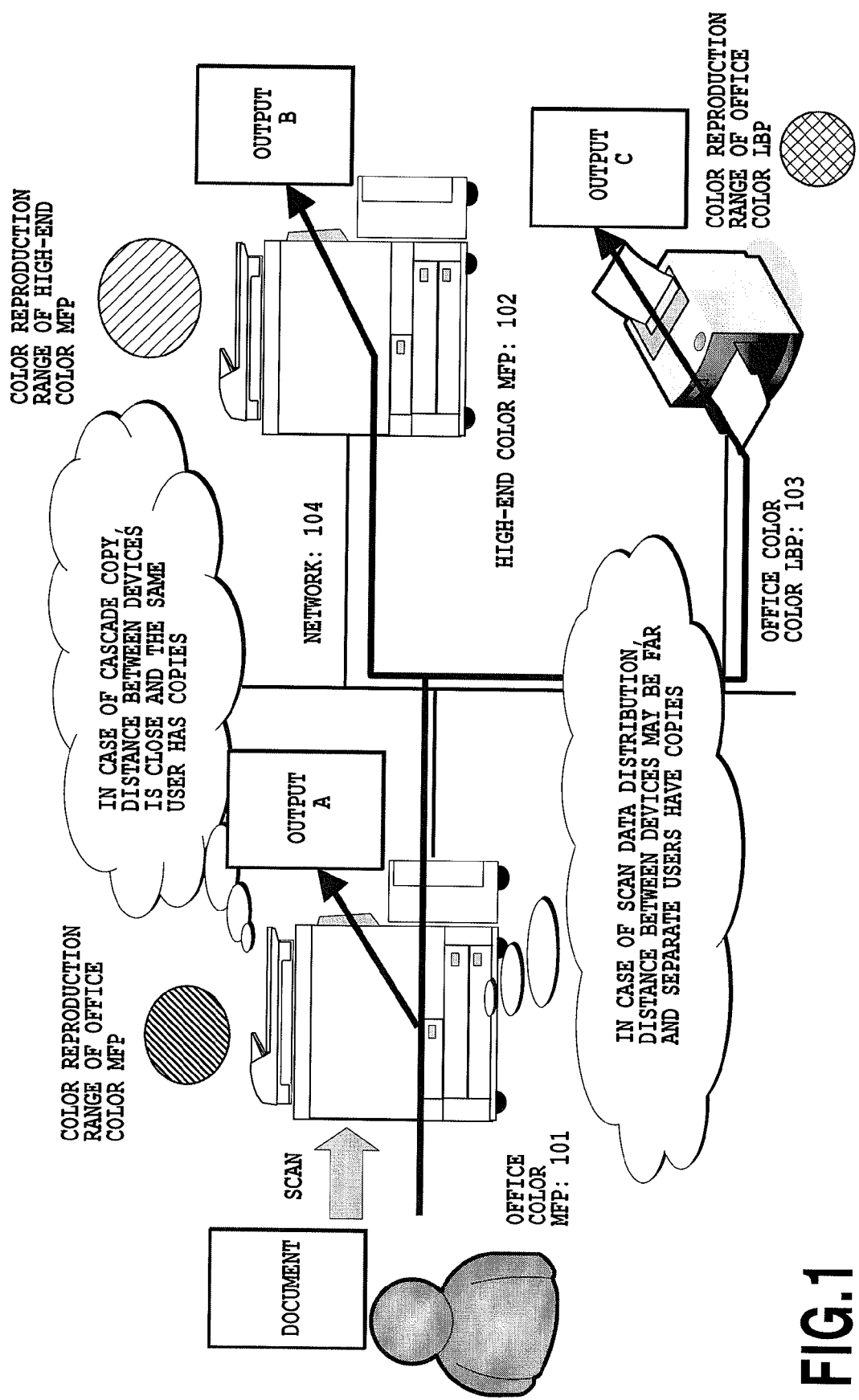
FIG. 1 is a schematic view illustrating an overview of a system in a first embodiment of the present invention.

Hereinafter, the embodiments of the present invention will be described in detail with reference to the accompanying drawings. Note that in the drawings described below, the one having the same function is given the same reference numeral to omit the duplicated description.

First Embodiment

<Overview Description of the System>

FIG. 1 is a view illustrating an overview of a system in this embodiment.

In FIG. 1, an office color MFP (Multi-Function Peripheral) 101, a high-end color MFP102, and an office color LBP (Laser Beam Printer) 103 are connected to each other via a network 104. This illustrates that under such a situation, a user scans a document in the office color MFP101, and performs printing in three devices of the office color MFP101, the high-end color MFP102, and the office color LBP103 having different performances. Each of these office color MFP101, high-end color MFP102, and office color LBP103 has a printer unit, and functions also as an image forming apparatus (printing apparatus).

With such a configuration, an identical image (job) acquired in the image processing apparatus (e.g. office color MFP101) can be printed in a plurality of image forming apparatuses (e.g. high-end color MFP102, office color LBP103).

Figure 8:
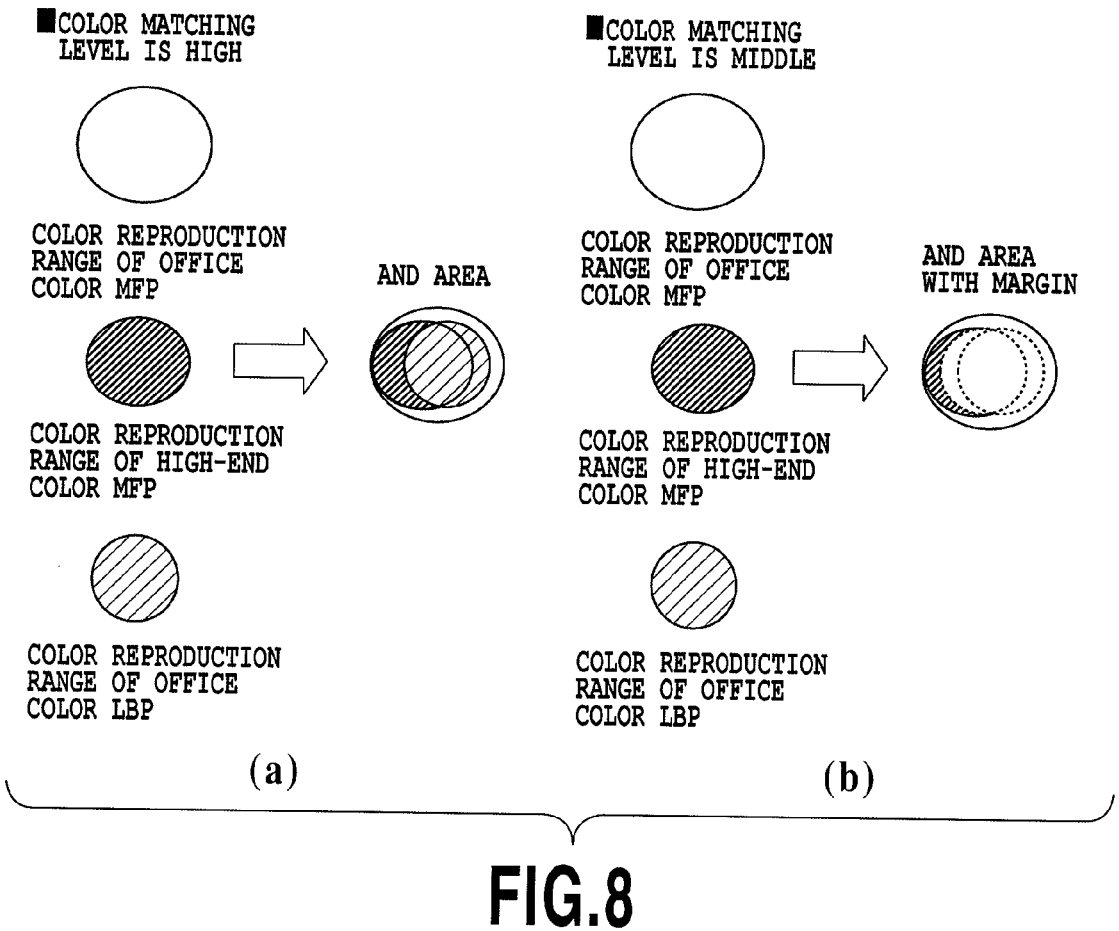
FIG. 8 is schematic view illustrating the concept of color matching between forwarding destination devices in the first embodiment of the present invention.

When a user places a text document on the office color MFP101 and performs cascade copy with three printing apparatuses of the MFP101, the high-end color MFP102, and the office color LBP103, this use case as cascade may be a use case where color matching between the printing apparatuses is important. Furthermore, for a text image, since a difference between the printed image (also referred to as the print image) and the document image is inconspicuous even if the color reproduction range is narrow, the color matching level may be high. Accordingly, for example, in a situation where the type of image is a text and the use case is cascade copy, the color matching level is regarded as high judging from the above-described both conditions, and as shown in FIG. 8(*a*) the printing is performed in an AND area (logical AND) of the color reproduction ranges of the three printing apparatuses.

On the other hand, when a user places an image document on the office color MFP101 and performs cascade copy in three printing apparatuses of the MFP101, the MFP102, and the LBP103, this use case as cascade may be a use case where the color matching between the printing apparatuses is important. However, for a picture image, differences between the print image and the document image are conspicuous if the color reproduction range is narrow, and therefore too much emphasis of the color matching between the printing apparatuses might not be good considering the type of image. Accordingly, for example, in a situation where the type of image is image and the use case is cascade copy, the color matching level is regarded as medium, and as shown in FIG. 8(*b*) the printing is performed in an AND area with a margin, which is obtained by giving a margin to the AND area of the color reproduction ranges of three printing apparatuses.

Moreover, when a user places a text document on the office color MFP101 and delivers the scan image read by this MFP101, that is, when the scan image distribution is performed by three printers of the office color MFP101, the high-end color MFP102, and the office color LBP103, this may be a use case where the color matching between the printing apparatuses is not so important. The reason is that the separate users respectively have the printed materials in the use case as distribution. However, for a text image, a difference from the document image is hardly conspicuous even if the color reproduction range is narrow, and therefore there are few tint problems even if the color matching between the printing apparatuses is emphasized. Accordingly, for example, in a situation where the type of image is a text and the use case is the scan image distribution, the color matching level is regarded as high, and as shown in FIG. 8(*a*) the printing is performed in the AND area of the color reproduction ranges of three printing apparatuses.

As described above, the optimum color matching processing is achieved by determining a color matching level among forwarding destination devices from a job situation (the type of image and/or the use case) when outputting one job in a plurality of printing apparatuses (forwarding destination devices) and by changing the processing.

Note that, in this specification, the "type of image" refers to the attribute of images, such as character, graphic, and image, for example.

Moreover, in this specification, the "use case" refers to a form in printing, in a system capable of printing an identical job in a plurality of image forming apparatuses, the job in at least one of the image forming apparatuses. The examples of such a form include the printing in a single image forming apparatus, the cascade printing, such as cascade copy and cascade print, or the distribution, such as scan image distribution or distribution print of a read image with a scanner, a FAX image, PDL data, or the like.

Here, the "cascade copy" refers to the following form. That is, a document is scanned in an apparatus A, and the scanned data is transmitted to an apparatus B and printed there. There may be multiple apparatuses B as the forwarding destinations. The scanned data is printed also in the apparatus A. Usually, in the "cascade copy", a job requiring a plurality of prints is distributed to a plurality of printing apparatuses, and the printing process is performed in each of the printing apparatuses, thereby increasing the productivity.

Moreover, the "cascade print" refers to the following form. That is, data is transmitted from a PC to the apparatus A, and this data is transmitted from the apparatus A to the apparatus B. Then, the data is printed in both of the apparatus A and the apparatus B. There may be multiple apparatuses B as the forwarding destinations. Usually, in the "cascade print", a job requiring a plurality of prints is distributed to a plurality of printing apparatuses, and the printing process is performed in each of the printing apparatuses, thereby increasing the productivity.

Moreover, the "scan image distribution" refers to the following form. That is, a document is scanned in the apparatus A, and the scanned data is transmitted to the apparatus B and printed there. There may be multiple apparatuses B as the forwarding destinations. The scanned data is not printed in the apparatus A.

Furthermore, the "distribution print" refers to the following form. That is, data is transmitted from a PC to the apparatus A, and this data is transmitted from the apparatus A to the apparatus B. The data is printed in both of the apparatus A and the apparatus B. There may be multiple apparatuses B as the forwarding destinations.

An important thing in the present invention is to perform, when outputting one job in at least one printing apparatus, the printing suitable for the type of image and/or the use case at the time of outputting (at the time of printing). Accordingly, when determining the color matching level, the determination may be made only from the type of image or only from the use case. That is, an image processing apparatus determines a color matching level based on at least one of the type of image and/or the use case at the time of outputting (at the time of printing), and thereby image data (image data for printing) having color reproduction ranges corresponding to various situations can be generated.

Although FIG. 1 shows an example of three output devices (image forming apparatuses), a client PC (information processing apparatus) and more multi-function peripheral apparatuses (MFPs) or LBPs may be connected to the network 104, of course.

<Description of the Configuration of MFP101>

Figure 2:
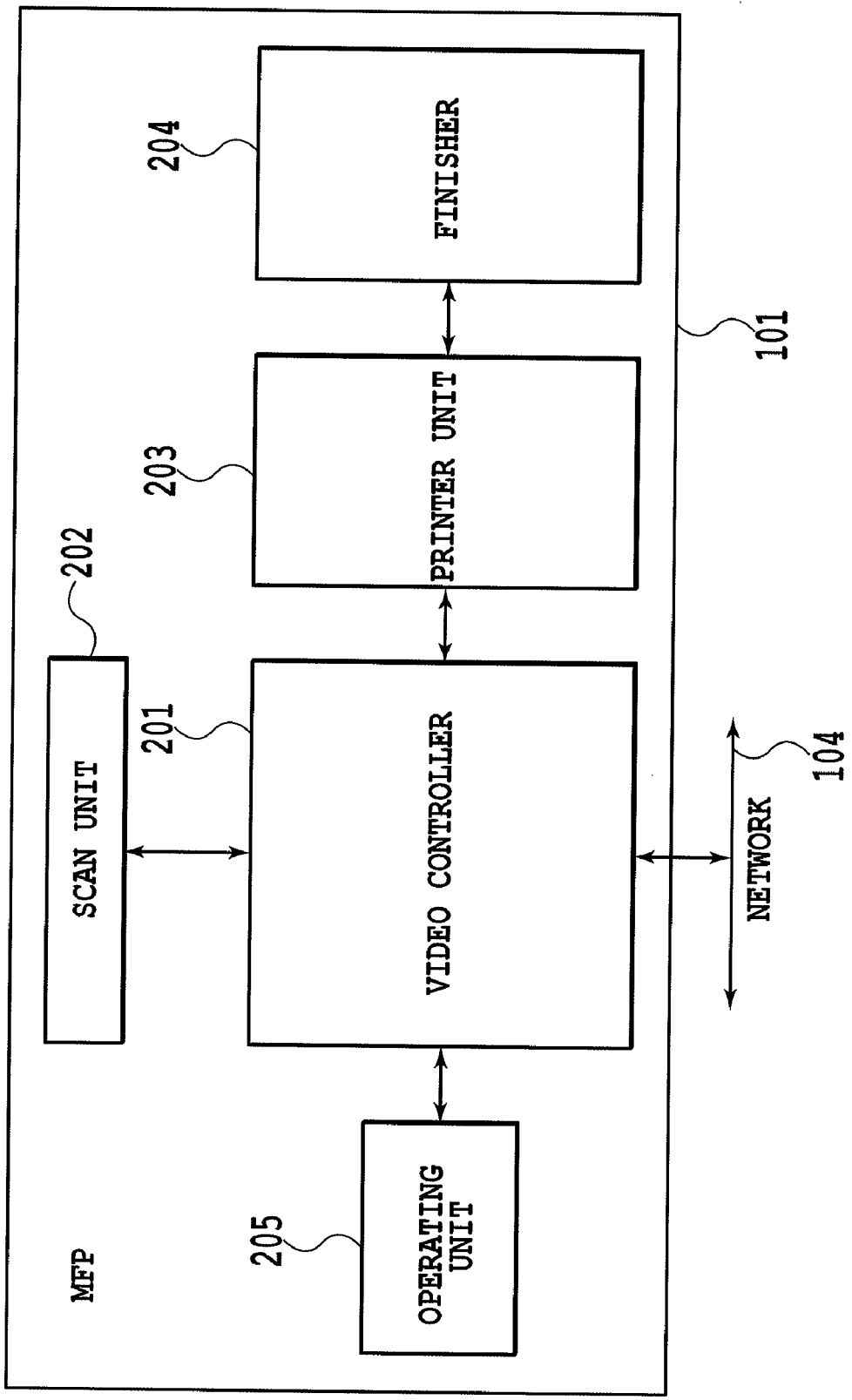
FIG. 2 is a block diagram showing a configuration example of an image processing apparatus MFP101 in the first embodiment of the present invention.

FIG. 2 is a diagram showing the configuration of MFP101 as an image processing apparatus in this embodiment. In this embodiment, as the image processing apparatus, a multi-function peripheral apparatus (MFP) having various functions, such as a print function, a copy function, and a scanner function, will be described as an example.

Figure 3:
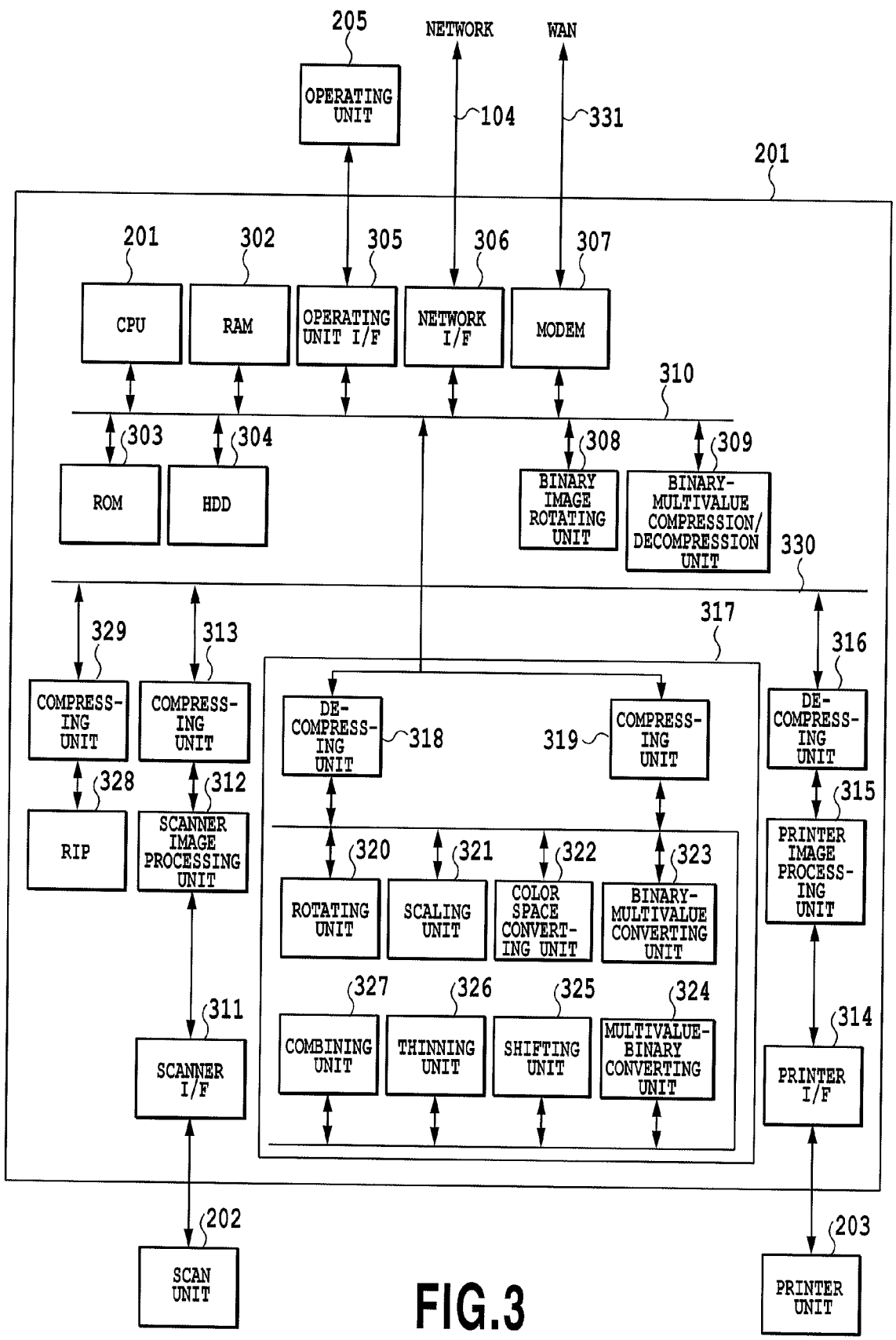
FIG. 3 is a block diagram showing a configuration example of a video controller 201 in the first embodiment of the present invention.

In FIG. 2, a video controller 201 for controlling MFP101, which is a multi-function peripheral apparatus (hereinafter, referred to as an "MFP"), has a hardware configuration to be described later as shown in FIG. 3. A scanner engine 202 optically reads a document image under control of the video controller 201. A printer engine 203 prints a printing image onto a recording medium under control of the video controller 201. As the printer engine 203, an electrophotographic laser beam printer will be described as an example. A finisher 204 connected to the printer engine 203 is capable of collectively performing staple processing to a plurality of recording media (e.g. sheets) output from the printer engine 203. The finisher 204 also performs staple processing and the like to the output recording medium under control of the video controller 201.

In this embodiment, as the printer engine an electrophotographic one is used, but not limited thereto. For example, an inkjet method of printing on a sheet by discharging an ink from an array of fine nozzles can also be applied.

A network (e.g. Ethernet (registered trademark)) interface 104 provides a two-way communication through the interface 104 to the video controller 201. Moreover, the provided functions become available by querying a later-described supervisor through the interface 104 from the outside. The provided functions include the maximum number of copies, the type of the finisher, the supported PDL, the number of output BINs to be designated, and the like. A user interface (UI) 205 comprises an LCD display and a keyboard, and displays information from the video controller 201 and also transmits an instruction from a user to the video controller 201. That is, the operating unit 205 is capable of displaying various kinds of information and is for inputting instructions from a user.

In this embodiment, the description of the high-end color MFP102 is omitted because it has the same configuration as that of FIG. 2. Moreover, the office color LBP103 can have a configuration other than that of the scanner unit 202 of FIG. 2.

Next, the detailed configuration of the multi-function peripheral apparatus (MFP) connected to the network 104 is described.

<Description of a Hardware Configuration of the Video Controller 201>

FIG. 3 is a diagram showing a hardware configuration of the video controller 201 shown in FIG. 2.

The video controller 201 is electrically connected to the scanner unit 202 and the printer unit 203, while it is connected to a print server (not shown), an external apparatus, and the like via the network 104 or a WAN 331. This makes it possible to input and output image data and device information.

The CPU 301 comprehensively controls access to various devices connected therewith based on a control program or the like stored in a ROM 303 and also comprehensively controls various types of processing performed in the controller.

A RAM 302 is a system work memory for the CPU 301 to operate and is also a memory to temporarily store image data. The RAM 302 is composed of an SRAM that holds stored contents even after power-off and a DRAM where contents stored therein are erased after power-off.

The ROM 303 stores a boot program of the apparatus and the like. A hard disk drive HDD 304 is capable of storing system software and image data.

An operating unit I/F 305 is an interface unit for connecting a system bus 310 to the operating unit 205. The operating unit I/F 305 receives image data to be displayed in the operating unit 205 from the system bus 310 and also outputs the image data to the operating unit 205, and outputs information input from the operating unit 205 to the system bus 310.

A network I/F 306 connects to the network 104 and the system bus 310, and inputs/outputs information. A modem 307 connects to the WAN 331 and the system bus 310, and inputs/outputs information. A binary image rotating unit 308 changes the direction of image data before transmission. A binary image compression/decompression unit 309 converts the resolution of image data before transmission to a predetermined resolution or a resolution matching other party's capability. Also, for compression and decompression, system such as JBIG, MMR, MR, and MH may be used. An image bus 330 is a transmission line for exchanging image data and is composed of a PCI bus or an IEEE 1394 bus.

A scanner image processing unit 312 performs correction, processing, and editing on image data received from the scanner unit 202 via a scanner I/F 311. Also, the scanner image processing unit 312 determines whether the received image data is data of a color document or a black-and-white document, or a text document or a photographic document, and the like. Then, it attaches the determination result to the image data. Such attached information is referred to as attribute data. Details of the process performed by the scanner image processing unit 312 will be described later.

A compressing unit 313 receives image data and divides the image data into blocks each consisting of 32 pixels×32 pixels. Here, the image data consisting of 32×32 pixels is referred to as tile data. In a document (a paper medium before reading), an area corresponding to this tile data is referred to as a tile image. To the tile data, average luminance information in the block of 32×32 pixels and a coordinate position on the document of the tile image are added as header information. Further, the compressing unit 313 compresses image data comprising a plurality of tile data. A decompressing unit 316 decompresses the image data comprising a plurality of tile data and then develops into a raster, and transmits the data to a printer image processing unit 315. The printer image processing unit 315 receives image data transmitted from the decompressing unit 316 and applies image processing to the image data with reference to the attribute data attached to the image data. The image data after image processing is output to the printer unit 203 via a printer I/F 314. Details of the process performed by this printer image processing unit 315 will be described below.

An image converting unit 317 applies a predetermined conversion process to image data. The image converting unit 317 comprises the following processing units.

A decompressing unit 318 decompresses received image data. A compressing unit 319 compresses received image data. A rotating unit 320 rotates received image data. A scaling unit 321 performs a resolution converting processing (e.g., from 600 dpi to 200 dpi) on received image data. A color space converting unit 322 converts a color space of received image data. The color space converting unit 322 can perform a well-known background color removal processing using a matrix or a table, a well-known LOG converting processing (a conversion from RGB to CMY), and a well-known output color correcting processing (a conversion from CMY to CMYK). A binary-multivalue converting unit 323 converts received binary gradation image data to 256-step gradation image data. Reversely, a multivalue-binary converting unit 324 converts received 256-step gradation image data to binary gradation image data using a technique such as an error diffusion processing.

A combining unit 327 combines received two pieces of image data to generate one piece of image data. When two pieces of image data are combined, a method for composition using an average of luminance values of corresponding pixels to be combined as a composite luminance value or a method for composition using a luminance value of a pixel higher in a luminance level as a luminance value of a pixel after composition is applied. Alternatively, a method for composition using a luminance value of a pixel lower in a luminance level as a luminance value of a pixel after composition can also be used. Furthermore, a method for determining a luminance value after composition by an OR operation, an AND operation, an exclusive OR operation, or the like of pixels to be combined can also be applied. All of these composition methods are widely known. A thinning unit 326 converts resolution by thinning out pixels of received image data and generates image data such as half, quarter, or one-eighth image data. A shifting unit 325 attaches a margin to received image data or deletes a margin from received image data.

A RIP 328 receives intermediate data generated based on PDL code data transmitted from a print server (not shown) or the like, and generates (multivalued) bit map data.

<Detailed Description of the Scanner Image Processing Unit 312>

Figure 4:
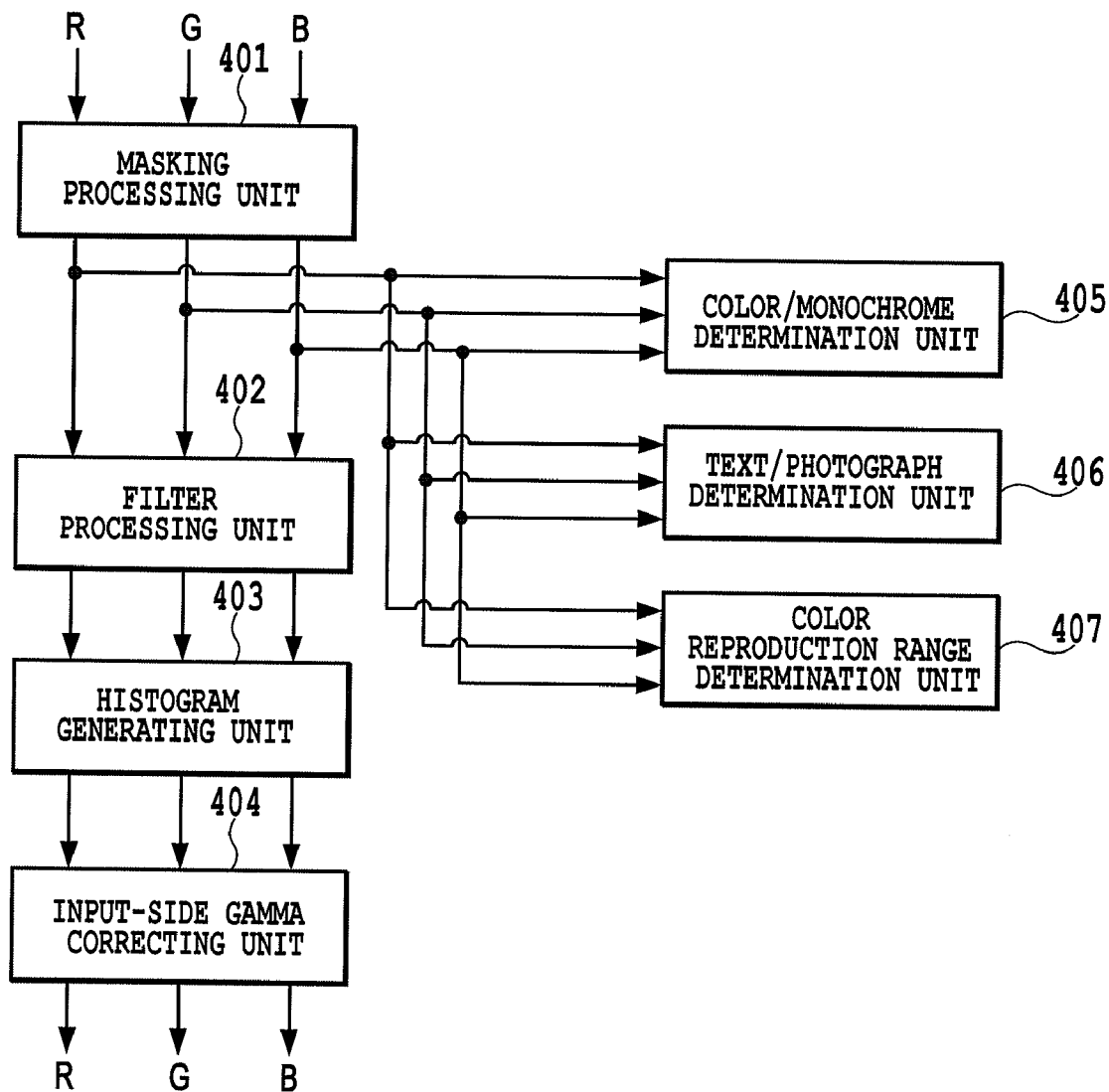
FIG. 4 is a block diagram showing a configuration example of a scanner image processing unit 312 in the first embodiment of the present invention.

FIG. 4 shows an internal configuration of the scanner image processing unit 312.

The scanner image processing unit 312 receives image data consisting of R, G, and B luminance signals each having 8 bits. The luminance signals are converted to standard luminance signals that do not depend on filter colors of the CCDs by a masking processing unit 401.

A filter processing unit 402 arbitrarily corrects a spatial frequency of received image data. This processing unit performs an operation process using, for example, a 7×7 matrix on the received image data. In addition, in a copier or a multifunction apparatus, a user can select a text mode, a photographic mode, or a text/photographic mode as a copy mode by operating the operating unit 205. When the text mode is selected by a user, the filter processing unit 402 applies a filter for text onto the entire image data. When the photographic mode is selected, the filter processing unit 402 applies a filter for photograph onto the entire image data. Moreover, when the text/photographic mode is selected, the filtering unit 402 adaptively switches filters for each pixel in accordance with a text/photograph determination signal, which is part of the attribute data, to be described later. That is, whether the filter for photograph or the filter for text is applied is determined for each pixel. Also, to the filter for photograph is set such a coefficient that smoothes only a high-frequency component. This is for making roughness of an image inconspicuous. To the filter for text is set such a coefficient that performs strong edge enhancement. This is for sharpening the text.

A histogram generating unit 403 samples luminance data of each pixel of received image data. More specifically, the histogram generating unit 503 samples luminance data in a rectangular area, defined by a start point to an end point designated in a main scanning direction and a sub-scanning direction, respectively, at constant pitches in the main scanning direction and the sub-scanning direction. Then, the histogram generating unit 503 generates histogram data based on the sampling results. The generated histogram data is used to estimate an background color level when performing an background color removal processing. An input-side gamma correcting unit 404 converts received data to luminance data having a nonlinear characteristic by using a table or the like.

A color/monochrome determination unit 405 determines whether each pixel of received image data is chromatic color or achromatic color, and attaches the determination result to the image data as a color/monochrome determination signal, which is part of the attribute data.

A text/photograph determination unit 406 determines whether each pixel of image data is a pixel that constitutes a text, a pixel that constitutes a halftone dot, a pixel that constitutes a text in halftone dots, or a pixel that constitutes a solid image based on a pixel value of each pixel and pixel values of peripheral pixels of each pixel. Note that the pixels that cannot be classified into any one of them are pixels constituting a white area. Then, the text/photograph determination unit 506 makes the determination result accompany the image data as a text/photograph determination signal, which is part of the attribute data.

A color reproduction range determination unit 407 determines a color range of received image data, and also computes a color reproduction range designated in a transfer job based on the color reproduction range information of each device responded from each device. Each device stores device-dependent color reproduction range information called an ICC profile in the ROM 303 or the HDD 304, and transmits the color reproduction range information to an image processing apparatus in response to a query from the image processing apparatus.

<Detailed Description of the Printer Image Processing Unit 315>

Figure 5:
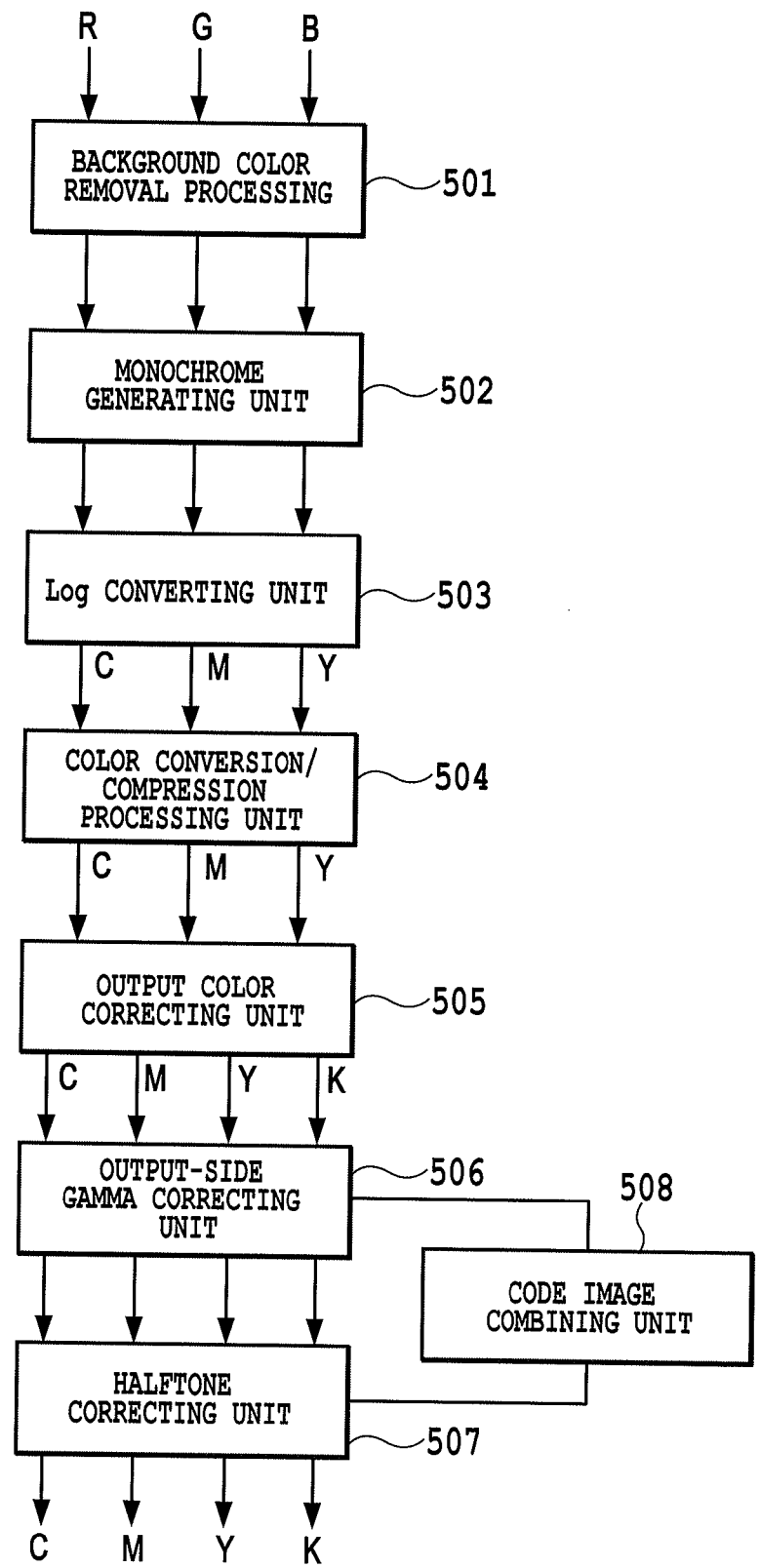
FIG. 5 is a block diagram showing a configuration example of a printer image processing unit 315 in the first embodiment of the present invention.

FIG. 5 shows an internal configuration of the printer image processing unit 315.

An background color removal processing unit 501 removes an background color of image data by use of the histogram generated by the scanner image processing unit 312. A monochrome generating unit 502 converts color data to monochrome data. A log converting unit 503 performs a luminance/density conversion. For example, the Log converting unit 503 converts input RGB image data to CMY image data.

A color conversion/compression processing unit 504 generates a compression table from colorimetry information and computes a color reproduction range in response to query for a color reproduction range from other device, and also compresses data to a designated range in accordance with a color reproduction range designated from other device. An output color correcting unit 505 performs an output color correction. For example, the output color correcting unit 505 converts input CMY image data to CMYK image data using a table or a matrix. An output-side gamma correcting unit 506 performs correction so that a signal value input to the output-side gamma correcting unit 506 is proportional to the reflection density value after a copy output. When meta information such as a background pattern is embedded, a code image combining unit 508 combines (document) image data with image data of meta information-embedded background pattern generated by a non-illustrated background pattern processing unit, by use of image data generated by a non-illustrated meta information image generating unit. A half tone correcting unit 507 performs a halftone processing in accordance with the number of gradation levels of the output printer unit. For example, for the received high-gradation image data, it carries out digitization to two levels or 32 levels.

Each processing unit of the scanner image processing unit 312 or the printer image processing unit 315 can also output received image data without applying each processing thereto. Passing data through a processing unit without applying any processing thereto in this manner is hereinafter expressed as "passing through the processing unit."

<Brief Description of a Software Configuration Concerning this Embodiment>

Next, a configuration of software (program module) is described, which is stored in the HDD 304 in the video controller 201, loaded into the memory (RAM) 302 and executed by the CPU 301.

Figure 6:
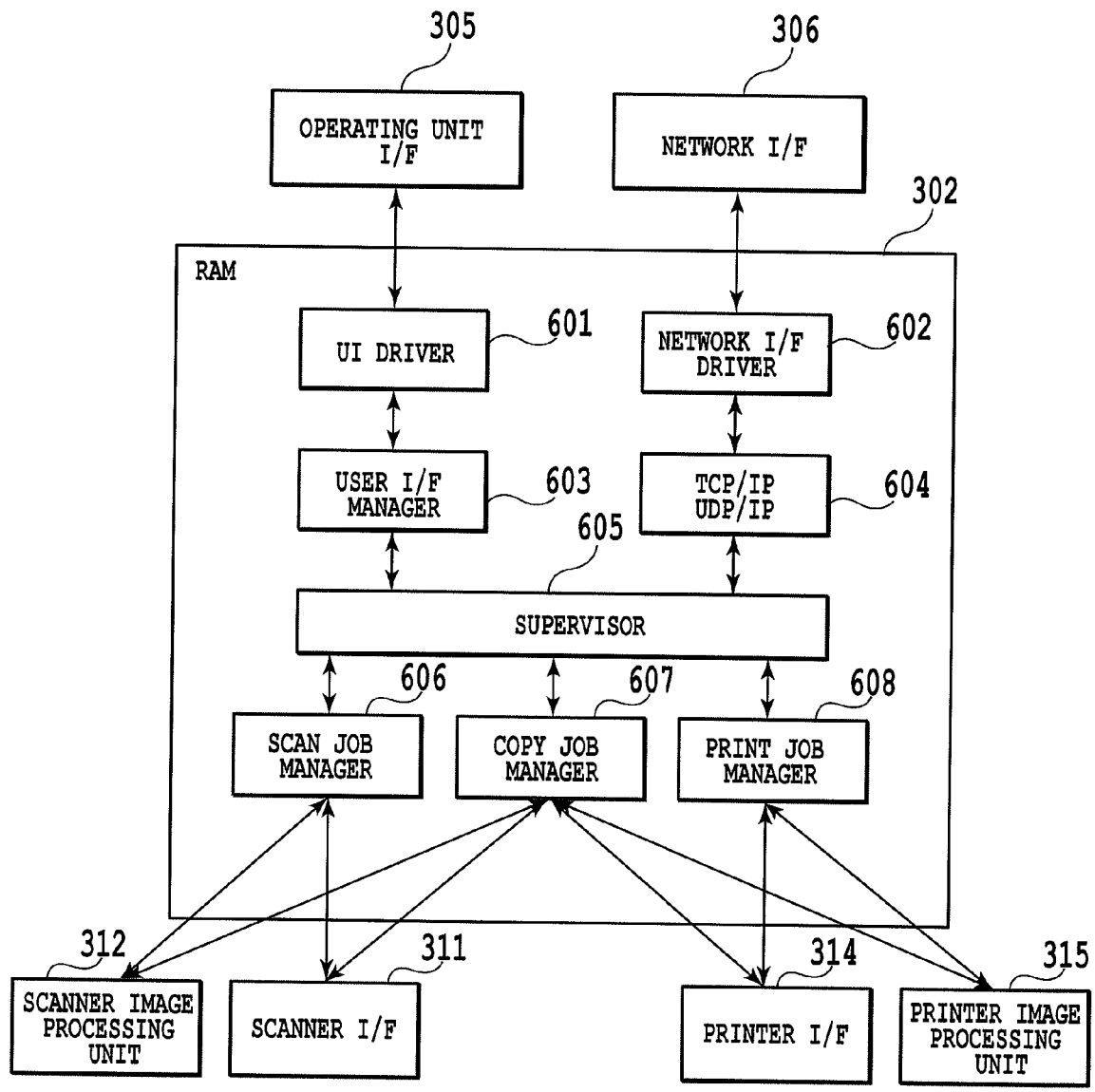
FIG. 6 is a diagram showing a configuration example of software in the first embodiment of the present invention.

FIG. 6 is a diagram showing the software configuration in this embodiment. In FIG. 6, a UI driver 601 controls the operating unit 205 shown in FIG. 3. A user I/F manager (control program) 603 acquires input information, which a user inputs from a keyboard of the operating unit 205, from the UI driver 601 and transfers this information to a supervisor 605 for supervising the operation of the video controller 201. Furthermore, the user I/F manager acquires a processing result of the video controller 201 via the supervisor 605, and instructs an LCD display of the operating unit 205 to display this result on a screen. That is, when a user operates the operating unit 205 and inputs an instruction regarding the use case, the supervisor 605 will acquire information (also, referred to as use case information) regarding the input use case via the operating unit I/F 305. Moreover, when a user inputs an instruction regarding the type of image via the operating unit 205, according to this input the supervisor 605 will acquire information (also referred to as image type information) regarding the above input type of an image via the operating unit I/F 305.

A network I/F driver (control program) 602 controls the network I/F 306. Then, the network I/F driver 602 performs processing of a physical layer (physical packet) on the network, i.e., extracts a transport packet from the physical packet and generates a physical packet from the transport packet.

A communication module 604 of TCP/IP, UDP/IP or the like transfers information on a transport packet output from the network I/F driver 602 to the supervisor 605. Moreover, the communication module 604 generates a transport packet from the information of the supervisor 605, and outputs this to the network 104 via the network I/F driver 602.

The supervisor 605 for supervising the operation of the video controller 201 holds data (an attribute table), such as identification information or the like of apparatuses, in the HDD 304. Furthermore, the supervisor 605 refers to data, such as the processing capabilities possessed by the later-described scan job manager 606, copy job manager 607, and print job manager 608, instructs to change the data, and performs delivery processing of jobs (a print job, a copy job, a scan job), and the like. The supervisor 605 further performs the later-described processing concerning this embodiment, based on a user input entered via the operating unit I/F 305 or on color reproduction range information of an image forming apparatus as the output target, the color reproduction range information being input via the network I/F 306.

In addition, in this specification, "color reproduction range information of an image forming apparatus as the output target (also simply referred to as color reproduction range information)" is information on an inherent color reproduction range possessed by an image forming apparatus (forwarding destination device) for processing a predetermined job. In this embodiment, as described later, an image forming apparatus to be a forwarding destination will transmit its own color reproduction range information to an image processing apparatus to be a forwarding source in response to a query (a request regarding acquisition of a color reproduction range inherent to the image forming apparatus) from the image processing apparatus.

The print job manager 608 manages printer resources and controls execution of jobs. In response to a request from the print job manager 608, an image processing on an output image is performed by the printer image processing unit 315, and the printer control is performed by communicating with a printer controller (not shown) for operating printer equipment via the printer I/F 314. The copy job manager 607 manages copy resources and copy jobs. The scanner job manager 606 manages scanner resources and controls execution of jobs. In response to a request from the scanner job manager 606, an image processing on an input image is performed by the scanner image processing unit 312, and the scanner control is performed by communicating with a scanner controller (not shown) for operating scanner equipment via the scanner I/F 311.

<Description of Determination Processing of a Color Matching Level Between Devices (Image Forming Apparatuses to be Output Targets)>

Figure 7:
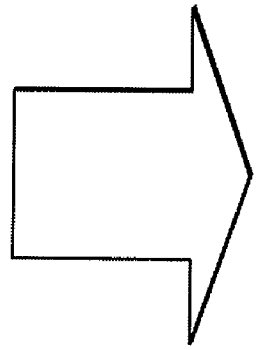
FIG. 7 is a schematic diagram illustrating a determination processing of color matching between forwarding destination devices in the first embodiment of the present invention.

FIG. 7 is a schematic diagram illustrating criteria for determining a color matching level between devices (forwarding destination devices) caused to perform the printing, in this embodiment.

As the system overview is illustrated in FIG. 1, the "use case" and the "type of image" are determination factors for the above-described determination. In this embodiment, based on the use case information and the image type information, the supervisor 605 scores for each use case and for each type of image, and determines a color matching level from these total scores. The higher the total scores, the higher priority is given to color matching between forwarding destination devices, while the lower the total scores, the higher priority is given to the color matching with a document rather than to the color matching between forwarding destination devices.

FIG. 7 shows an example of scoring as cascade=5 points, distribution=4 points, and single printing=0 point with regard to the use cases, and text=4 points, graphic=2 point, and image=1 point with regard to the types of image.

The criteria of scoring is not limited in particular, but can be set as follows.

Since the cascade copy is intended to increase the productivity when the same document is copied in large quantities, one person often has the printed material. Furthermore, a cascade copied document is often delivered as a meeting material, for example, and thus the color matching between devices (image forming apparatuses used for printing) should be emphasized so as not to cause inconvenience even if each document is used at a nearby location even after delivery. However, in the case of distribution of scan data or a FAX, separate users often have the printed material at separate locations and therefore the color matching between forwarding destination devices may not be emphasized as compared with cascade. For this reason, the score in the case of cascade is high and the score in the case of distribution becomes a value slightly lower than this. Moreover, when the printing is performed with one image forming apparatus in the cases of remote copy, FAX transfer, and the like, the color matching between forwarding destination devices does not need to be performed and therefore the score becomes a zero point.

Moreover, with regard to the type of image, for text, a difference from the document image is hardly conspicuous as compared with graphic or an image even if the color reproduction range becomes narrow, while for image, a difference from the document image is most conspicuous because a variety of colors are often used and furthermore the image is to be compared with the existing object, like a photographic image. For this reason, the score of text is high and the score of image becomes a low value.

If a sum of both is equal to or greater than 8 points the color matching level=high, if it is in a range of 5 to 7 points the color matching level=middle, and if it is not more than 4 points the color matching level=low. If the color matching level is high, an image processing giving priority to color matching between forwarding destination devices is performed, and if the color matching level is middle, an image processing for moderately matching colors between forwarding destination devices is performed, and if the color matching level is low, color matching processing between forwarding destination devices is not performed.

That is, the supervisor 605 acquires a score regarding a use case with reference to a criterion (a first criterion) for scoring the use case, based on the use case information. Similarly, the supervisor 605 acquires a score regarding a type of image with reference to a criterion (a second criterion) for scoring the type of image, based on the image type information. Next, the supervisor 605 adds the acquired score regarding the use case to the score regarding the type of image. Then, the supervisor 605 compares the added score with a criterion (a third criterion) for determining a color matching level and determines the color reproduction range of an image transmitted to an image forming apparatus. In this embodiment, as shown in FIG. 7, since a method for determining a color range of an image transmitted to an image forming apparatus is determined for each color matching level, the supervisor 605 determines to perform a processing of the color matching level corresponding to the above-described added score.

These first to third criteria may be defined in advance, or may be set by a user input.

In addition, in this specification, the "color matching level" refers to a criterion in generating a color reproduction range of the image data for printing, the color reproduction range being transmitted to an image forming apparatus, in which a job to be processed is processed. As described above, it is determined in accordance with the color matching level whether to give priority to color matching between forwarding destination devices, to moderately match colors between forwarding destination devices, or not to perform color matching processing between forwarding destination devices. That is, based on a color matching level, a color reproduction range of the image data for printing is determined.

As specific processing, if the added score is within a range of high color matching levels, the supervisor 605 will make a decision that a color reproduction range in printing an image is set to the logical AND of color reproduction ranges of the image forming apparatuses used for printing a current job. The logical AND of color reproduction ranges (also referred to as an AND area of color reproduction ranges) will be described later. Moreover, if the added score is within a range of middle color matching levels, the supervisor 605 will make a decision that a color reproduction range in printing an image is set to an area obtained by expanding the logical AND of the color reproduction ranges by a predetermined area. That is, an area having a margin to the logical AND of color reproduction ranges is the color reproduction range in printing the image. Furthermore, if the added score is within a range of low color matching levels, the supervisor 605 will not perform color matching processing between forwarding destination devices, but set a color reproduction range in printing an image to the color reproduction range of an image forming apparatus that performs printing.

That is, the supervisor 605 will determine whether or not to perform color matching between devices, based on the comparison result.

In this way, in this embodiment, since the user-desired use case and the type of a printing image are scored, and a color reproduction range in printing the image is determined based on a color matching level obtained from the total score, an appropriate color matching corresponding to a printing situation can be performed.

Note that the image type information may be acquired based on a user input as described above, or an image processing apparatus may determine the type of image based on the image to be printed which this image processing apparatus holds, thereby acquiring the image type information from this determination result.

Moreover, FIG. 7 shows an example of determining a color matching level based on the use case and the type of image, but a color matching level may be determined based on either one of the use case and the type of image. In this case, a third criterion as described above corresponding to either one of the use case and the type of image may be provided so that a color matching level may be determined by comparing the either one of the scores with this criterion.

<Description of the Concept of Color Matching Between Devices>

FIG. 8 are schematic view illustrating a method of performing color matching between a plurality of devices, in this embodiment.

As a result of determination using the determination method in FIG. 7, if the color matching level between devices=high, the printing is performed in an AND area of the color reproduction ranges of three printing apparatuses (office color MFP101, high-end color MFP102, office color LBP103) as shown in FIG. 8(*a*). Thus, the color matching is realized by completely matching color ranges used in three devices.

On the other hand, if the color matching level between devices=middle, the color reproduction range is expanded within an inconspicuous range by performing printing in an AND area with a margin, which is obtained by giving a margin to the AND area of the color reproduction ranges of three printing apparatuses as shown in FIG. 8(*b*), thereby performing the printing in each device.

When a color matching between devices may not be emphasized as compared with a situation where a color matching level between devices is high as in cascade copy or the like, the color reproduction range of a target printing apparatus can be approached by providing this margin. That is, by including at least an AND area of color reproduction ranges and providing an area serving as a margin in accordance with a color matching level, it is possible to improve color matching between the printing apparatuses and also achieve color reproduction for each printing apparatus.

In this way, the color reproduction range of the image data for printing is set to an AND area of color reproduction ranges of image forming apparatuses used in printing, an AND area with a margin, or a color reproduction range inherent to an individual image forming apparatus in accordance with a color matching level, so the printing suitable for various situations can be performed.

For example, when the color matching level is high, priority is given to color matching between devices and therefore an AND area of color reproduction ranges serves as the color reproduction range of the image data for printing. Accordingly, depending on image forming apparatuses, the color reproduction range of the image data for printing, which is an AND area of color reproduction ranges, may become quite smaller than the original color reproduction range. However, as described above, in this case, priority is given to color matching between devices, so even if there is a slight difference in the tint between the document image and the print image, the user's desire to perform color matching between devices is satisfied. Accordingly, the print result corresponding to the situation can be obtained.

On the other hand, when the color matching level is middle, moderate color matching between devices are required, so the one having a margin by expanding the AND area by a predetermined area serves as the color reproduction range of the image data for printing. As a result, the above-described AND area with a margin can approach the color reproduction range inherent to each of the image forming apparatuses by the amount of this margin, and therefore an image close to the original color reproduction of each of the image forming apparatuses can be output while reducing a difference in the tint between devices.

Moreover, when the color matching level is low, color matching between devices is not required (e.g., the printing is performed in a single image forming device, not in a plurality of image forming devices). Therefore, the color reproduction range of the image data for printing is set to a color reproduction range inherent to an image forming device for performing the printing. Consequently, printing fully exhibiting the color reproduction of an image forming apparatus for performing printing can be performed.

In this way, according to this embodiment, a color matching level is determined in accordance with the use case or the type of image, and the color reproduction range of the image data for printing is set in accordance with this color matching level. Therefore, the correction corresponding to various situations can be made in each of the forwarding destination devices, and also user-desired printing suitable for the various situations can be performed.

<Description of Software Processing of MFP101>

Hereinafter, an image processing device (forwarding source device) capable of transmitting an identical image (job) to a plurality of image forming apparatus is represented by MFP101. Then, the description is made assuming that the destination image forming apparatuses (forwarding destination devices) of an image (job) transmitted from the MFP101 are MFP102, LBP103.

Figure 9:
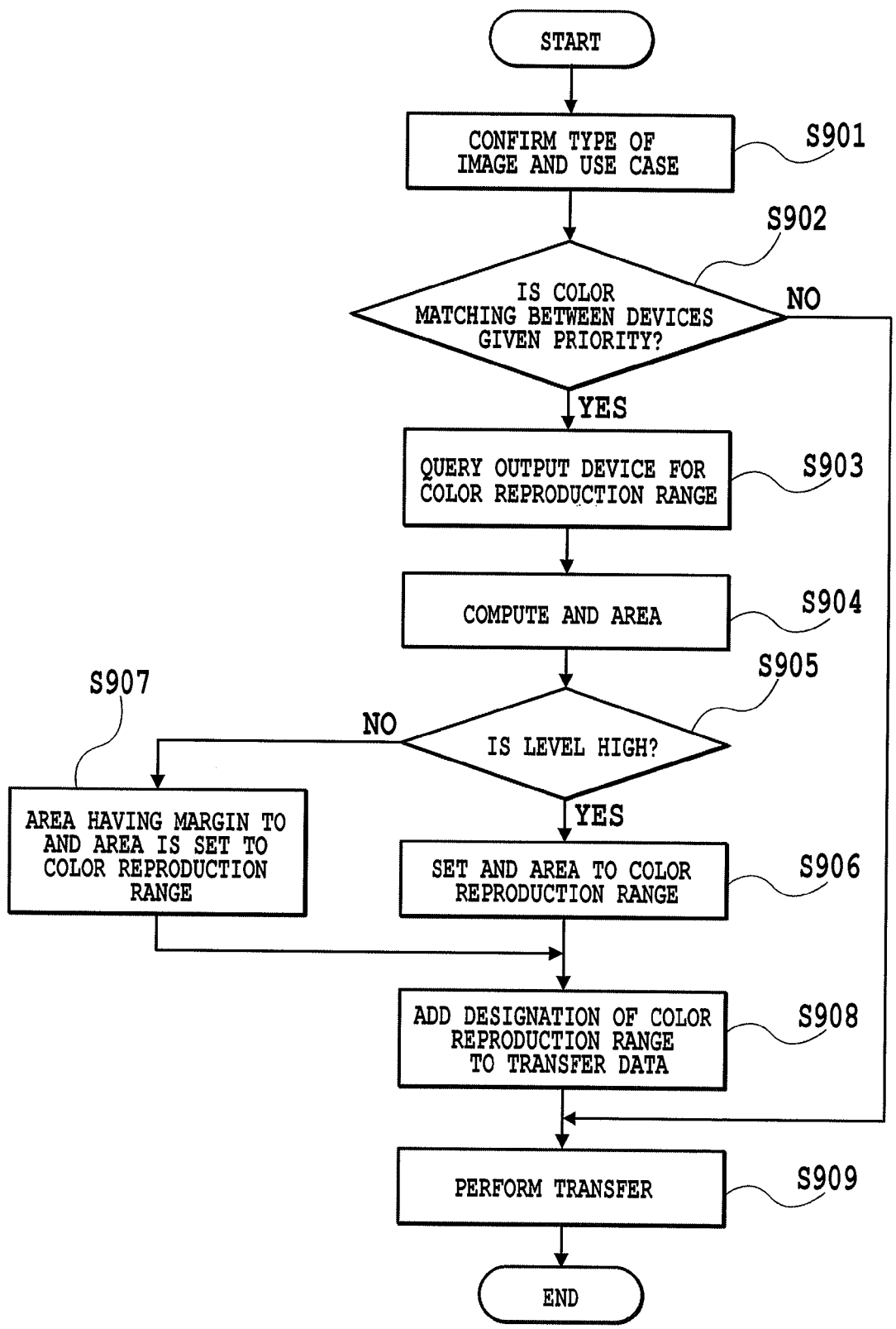
FIG. 9 is a flowchart illustrating software processing of a forwarding source device MFP101 in the first embodiment of the present invention.

FIG. 9 is a flowchart illustrating processing of the forwarding source device (MFP101) in this embodiment.

In FIG. 9, a user operates the operating unit 205 and inputs an instruction to print an identical job in at least one image forming apparatus (forwarding destination device), as a use case, such as cascade or distribution, and also an instruction regarding the type of image. Then, the supervisor 605 receives the user input and starts a processing corresponding to this user input.

In Step S901, the supervisor 605 confirms the use case and the type of image, and determines a color matching level between devices. That is, the supervisor 605 acquires the use case information and the image type information from the user input, and confirms the use case and the type of image from the acquired information. Then, the supervisor 605 checks the confirmed use case and type of image with the above-described first criterion and second criterion as shown in FIG. 7, and acquires each score and calculates a total score. Furthermore, the supervisor 605 compares this total score with the third criterion to acquire a color matching level.

Note that, the use case can be determined because the information is added as an attribute of a job in designating cascade, distribution, or the like by the operating unit 205. Moreover, the type of image can be determined in the text/photograph determination unit 406 described in FIG. 4 if it is scan data. Moreover, the type of image can be determined from a designated command in interpreting a PDL language if it is PDL data.

Next, in Step S902, the supervisor 605 determines whether or not to perform color matching between forwarding destination devices (image forming apparatuses in which a job to be processed is processed), based on the color matching level acquired in Step S901. That is, the supervisor 605 determines whether or not to change the color reproduction range of the image data for printing from a color reproduction range inherent to a forwarding destination device to an area (an AND area or an AND area with a margin) containing at least an AND area of the color reproduction ranges of the forwarding destination devices. In this embodiment, when the color matching level is high or middle, it is determined that color matching is performed, and therefore the color reproduction range of the image data for printing becomes an area containing at least the AND area. On the other hand, when the color matching level is low, it is determined that color matching is not performed, and therefore the color reproduction range of the image data for printing becomes the color reproduction range inherent to the forwarding destination device, not the area containing at least the AND area.

When the color matching level is low, i.e., when printing is performed with one device as in remote copy, the process goes to Step S909, where the transfer is performed and the process is terminated. On the other hand, in Step S902, when the color matching level is high or middle, for example, when the printing is performed in a plurality of devices, the supervisor 605 determines that color matching between forwarding destination devices is performed to some degree or another, and the process proceeds to Step S903.

In Step S903, the supervisor 605 queries all the image forming apparatuses (the respective image forming apparatuses, i.e., output devices), which process a current job, for their color reproduction ranges, in other words, the supervisor 605 makes a request to acquire their color reproduction ranges. In this embodiment, the image forming apparatuses to process the job are MFP102, LBP103. Therefore, MFP101 as the image processing apparatus transmits query information for causing MFP102 and LBP103 to transmit the color reproduction range information of image forming apparatuses as the output targets of the respective apparatuses to MFP101, to MFP102 and LBP103 via the network 104. Upon receipt of the query information, MFP102 and LBP103 will respond to the query from MFP101 by transmitting the color reproduction range information indicative of the color reproduction ranges inherent thereto to MFP101 in a manner as described later. When MFP101 receives the responses from MFP102 and LBP103, the supervisor 605 will acquire the respective color reproduction range information of MFP102 and LBP103.

In Step S904, the supervisor 605 computes an AND area of the color reproduction ranges of MFP102 and LBP103 from the result of Step S903 in the color reproduction range determination unit 407 described in FIG. 4. That is, based on each color reproduction range information acquired in Step S903, the supervisor 605 calculates logical AND of the color reproduction range of MFP102 and the color reproduction range of LBP103 and computes the AND area.

In Step S905, the supervisor 605 determines at which level the color matching level acquired in Step S901 resides (whether the level is "high" or "middle"?), in accordance with the color matching level determination criteria described in FIG. 7.

If the supervisor 605 determines as the color matching level=high, the AND area computed in Step S904 is determined as the color reproduction range (the color reproduction range of the image data for printing) for processing the relevant job (Step S906). If the supervisor 605 determines as the color matching level=middle, an AND area with a margin, which is obtained by giving a margin to the computed AND area, is determined as the color reproduction range for processing the relevant job (Step S907).

In Step S908, the supervisor 605 adds the color reproduction range determined in Steps S906, S907 to the image data for printing so that the designated color reproduction range of this job may be interpreted in the forwarding destination devices (MFP102, LBP103). Then, in Step S909, the supervisor 605 performs the transfer of the image data for printing, which is the transfer data to the forwarding destination devices MFP102, LBP103, and terminates the processing. When this step continues from Step S908, i.e., when color matching between forwarding destination devices is performed, the above determined color reproduction range is added to the image data for printing. On the other hand, when this step continues from Step S902, this is the case where color matching between devices is not performed, and therefore information on the color reproduction range computed in MFP101 is not added to the image data for printing as the transfer data.

<Description of Software Processing of MFP102, LBP103>

Figure 10:
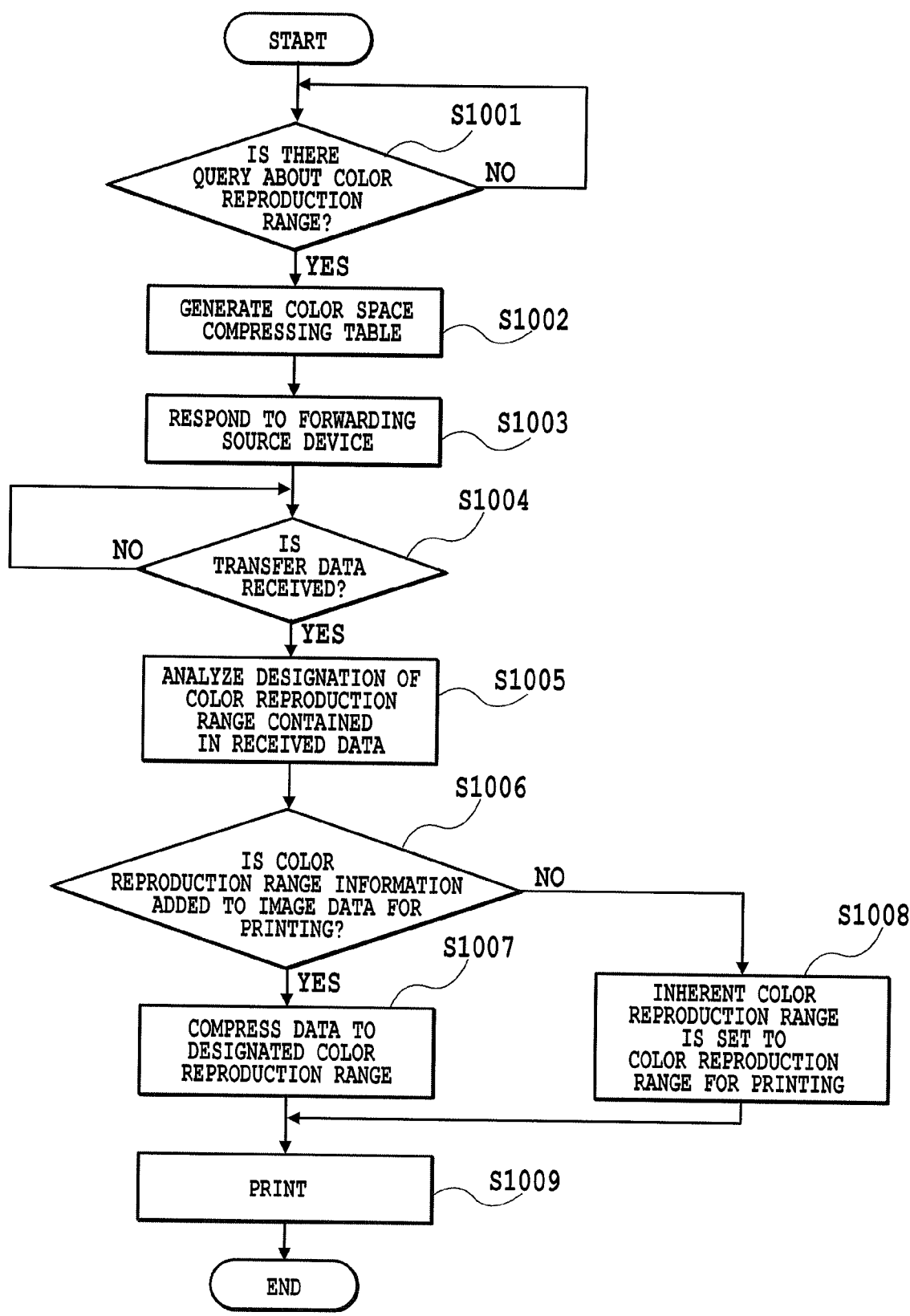
FIG. 10 is a flowchart illustrating software processing of forwarding destination devices MFP102, LBP103 in the first embodiment of the present invention.

FIG. 10 is a flowchart illustrating processing of the forwarding destination devices (MFP102, LBP103) in this embodiment.

The forwarding destination devices are devices for receiving a job from a forwarding source device and performing the printing, and correspond to MFP102 and LBP103 in this embodiment. In the processing shown in FIG. 10, since the same processing is performed in MFP102 and LBP103, hereinafter the description is made calling MFP102 and LBP103 as the forwarding destination device.

In Step S1001, the forwarding destination device waits for a query of a color reproduction range from the forwarding source device MFP101.

If there is a query of a color reproduction range from the forwarding source device, then in Step S1002, the forwarding destination device dynamically generates a color space compression table from colorimetry information of the device, and acquires a color reproduction range inherent thereto, in the color conversion/compression processing unit 504 described in FIG. 5. In dynamically generating the color space compression table, a well-known color management technique, such as, for example, a technique using an ICC profile, may be used.

In Step S1003, the forwarding destination device responds to the query from MFP101 by transmitting color reproduction range information on the color reproduction range acquired in Step S1002 to the forwarding source device MFP101.

In this manner, when there is a query from MFP101 about the color reproduction range, which the forwarding destination device inherently possesses, this device will transmit color reproduction range information indicative of the inherently possessed color reproduction range to MFP101.

In Step S1004, the forwarding destination device waits for the reception of transfer data (image data for printing with an added color reproduction range determined by MFP101, or the image data for printing) from the forwarding source device (MFP101).

Upon receipt of the transfer data from MFP101, in Step S1005 the forwarding destination device analyzes the designated color reproduction range contained in the received transfer data using the color conversion/compression processing unit 504. That is, the forwarding destination device extracts the color reproduction range determined in MFP101 from the received transfer data.

In Step S1006, the forwarding destination device determines whether or not the color reproduction range determined by MFP101 is added to the image data for printing received in Step S1004. Specifically, if the color reproduction range determined by MFP101 is extracted as a result of the analysis in Step S1005, the forwarding destination device determines that the color reproduction range determined by MFP101 is added, and the process proceeds to Step S1007.

On the other hand, if the color reproduction range determined by MFP101 is not extracted in Step S1005, the forwarding destination device determines that the color reproduction range determined by MFP101 is not added, and the process proceeds to Step S1008. In this case, since MFP101 has determined that color matching between devices is not required, information on the color reproduction range determined by MFP101 is not added to the image data for printing as the transfer data. Therefore, in Step S1008, the forwarding destination device makes a decision that the color reproduction range inherent thereto acquired in Step S1002 is used as the actual color reproduction range for printing.

In Step S1007, the forwarding destination device compresses the image data for printing received in Step S1005 to a designated color reproduction range (color reproduction range that is determined by MFP101 and acquired in Step S1005).

In Step S1009, the forwarding destination device performs printing using the image data compressed in Step S1007. That is, the forwarding destination device compresses the image data for printing so as to fall within a range designated by the color reproduction range determined by MFP101, and performs the printing within the above-described range.

These processings are performed in all the devices which process the relevant job, and the printing within the designated color reproduction range is performed.

By configuring as in this embodiment, color matching between devices optimum for a use case or the type of image can be realized in printing one job in a plurality of devices.

Second Embodiment

In the first embodiment, in the process to give a margin to an AND area, which is computed by querying each of the forwarding destination devices, a direction to expand the margin has not been described yet. In this embodiment, in accordance with the color range of a print job, the margin may be expanded in a direction to cover the color range of the job as much as possible. Alternatively, depending on a job, a user may designate a color desired to be matched between devices so that the user can select to expand the margin according to this designation.

Since the basic configuration concerning this embodiment is the same as that of the first embodiment, portions different from the first embodiment will be described using FIG. 11, FIG. 12.

Figure 11:
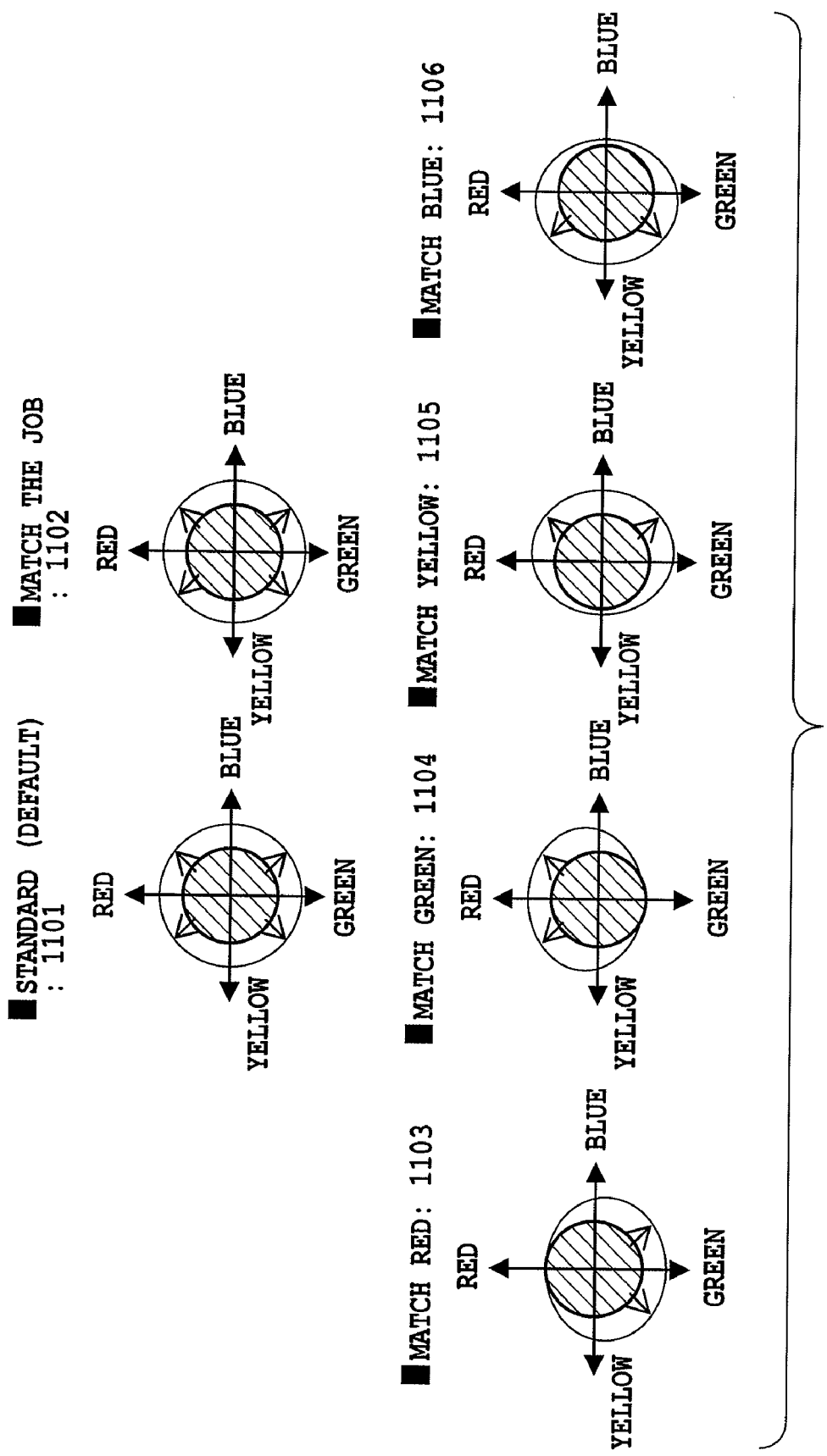
FIG. 11 is a schematic view illustrating directions to expand a color reproduction range in a second embodiment of the present invention.

FIG. 11 is a schematic view illustrating the expansion directions of a color reproduction range in this embodiment.

Circles shown in FIG. 11 schematically represent color reproduction ranges, where a hatched portion is an AND area of output devices and a circle on its outer side represents an AND area with a margin.

A standard (default) 1101 indicates an image designated to expand the margin uniformly in all the directions, and reference numeral 1102 to match a job indicates an image designated to expand the margin in the direction to increase the coverage of the color range of the job. Furthermore, reference numerals 1103 to 1106 indicate images designated to expand the margin in the direction to match red, green, yellow, and blue between devices, respectively. For example, if red is desired to be matched, then the reproduction range of red should be the same in the respective devices, so as shown in 1103 where red is to be matched, the margin in a direction least affecting red is mainly expanded. The same is true of the others of green, yellow, and blue, and the margin is expanded in the direction opposite to a color desired to be matched.

Although not illustrated, the configuration of FIG. 11 may be as-is displayed as a UI in the operating unit 205 so that a user may select "standard", "match the job", "match red", "match green", "match yellow", or "match blue" to perform customization. In this case, a user operates the operating unit 205 to designate the followings. That is, a predetermined area in determining that the logical AND of color reproduction ranges is set to an area expanded by the predetermined area is designated (a user selects the above-described "standard", "match the job", "match red", "match green", "match yellow", or "match blue"). After this designation is made, MFP101 will receive a user input regarding the designation of the predetermined area. In acquiring the AND area with a margin, the supervisor 605 performs a processing to expand the AND area of color reproduction ranges by the predetermined area corresponding to the entered user input.

For example, when the above-described designation is the designation regarding matching a predetermined color between devices, such as "match red", the supervisor 605 changes the direction of expanding the AND area of color reproduction ranges (the direction of expanding margin) so that the predetermined color may match between devices. Note that an important thing here is to control expansion of the AND area of color reproduction ranges in accordance with the designation of a user. Accordingly, if the designation by a user is the designation concerning the expansion width (expansion width of margin) of the AND area, the supervisor 605 will change the expansion width (expansion width of margin) of the AND area of color reproduction ranges in accordance with the user input.

Figure 12:
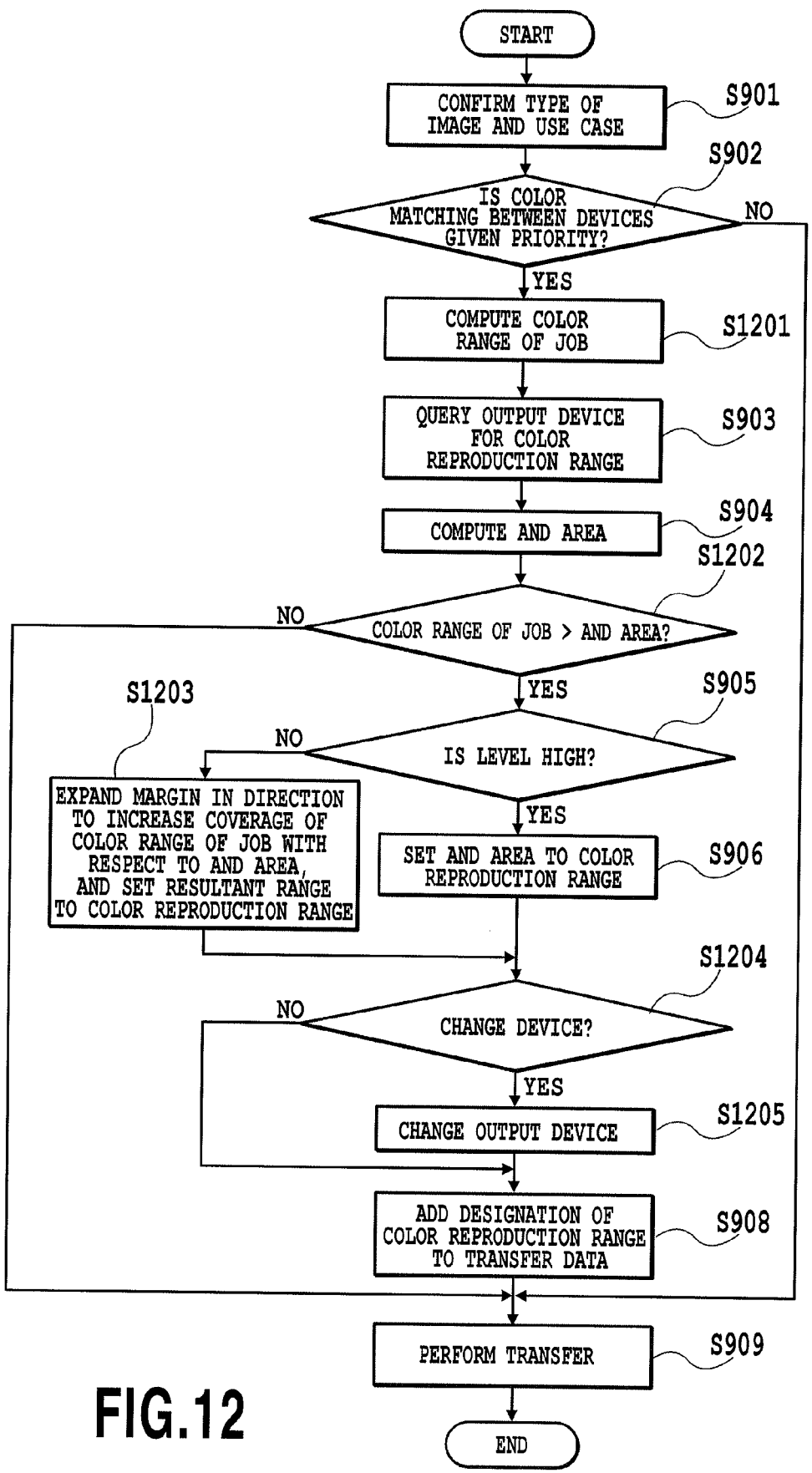
FIG. 12 is a flowchart illustrating software processing of a forwarding source device in the second embodiment of the present invention.

FIG. 12 is a flowchart illustrating software processing of a forwarding source device in this embodiment.

In FIG. 12, when processing of cascade or distribution, or printing one job in a plurality of devices is started, in step S901 the supervisor 605 confirms the use case and the type of image, and determines a color matching level between devices. The use case can be determined because information is added as an attribute of a job in designating cascade, distribution, or the like in the operating unit. Moreover, the type of image can be determined in the text/photograph determination unit 406 described in FIG. 4 if it is scan data. The type of image can be determined from a designated command in interpreting a PDL language if it is PDL data.

Next, in Step S902, if the printing is performed in one device as in remote copy, then the process proceeds to Step S909 and the supervisor 605 performs transfer and then terminates the process. On the other hand, if the printing is performed in a plurality of devices in Step S902, then in Step S1201, the supervisor 605 computes the color range of a job to be processed (image to be processed) in the color reproduction range determination unit 407 described in FIG. 4.

Next, in Step S903, the supervisor 605 queries all the forwarding destination devices (MFP102, LBP103) for color reproduction ranges inherent to the respective devices. From a result of Step S903, the supervisor 605 computes an AND area of color reproduction ranges for each of the forwarding destination devices in the color reproduction range determination unit 407 described in FIG. 4 (Step S904).

From the results of Step S1201 and Step S904, the supervisor 605 compares the color range of a job with the AND area of color reproduction ranges of the forwarding destination devices in Step S1202. As a result of the comparison, if the color range of a job<the AND area, the color range of a job has fallen within the color reproduction ranges of all the forwarding destination devices. Accordingly, particular color matching processing is not performed and the transfer of a job is performed in step S909, and the process is terminated. In Step S1202, the supervisor 605 compares the color range of a job with the AND area and if the color range of a job>the AND area, then the process proceeds to Step 905.

In Step S905, the supervisor 605 determines whether the color matching level acquired in Step S901 is high or not. If it is determined as the level=high in accordance with the determination criteria on the color matching level described in FIG. 7, the supervisor 605 will determine the computed AND area as the color reproduction range for processing a relevant job (Step S906).

If it is determined as the level=middle, the supervisor 605 will determine the AND area with a margin, which is obtained by giving a margin to the AND area computed in Step S904, as the color reproduction range for processing the relevant job (Step S1203). That is, the supervisor 605 sets a margin of the AND area and expands the AND area by this margin so as to approach the color range of the job to be processed that is computed in Step S1201.

Although not illustrated, the designation of expansion direction of the color reproduction range can be preset by performing the display shown in FIG. 11 in the operating unit 205. That is, it is possible not only to expand the color reproduction range in the direction to cover the color range of the job but to expand the margin in the direction to "match red", "match green", "match yellow", or "match blue".

In Step S1204, the supervisor 605 determines whether or not to change the forwarding destination device as an output device, based on a user input entered via the operating unit 205. That is, the supervisor 605 displays a UI (user interface) for inputting a change of the forwarding destination device in the operating unit 205. In this case, when a setting change of the forwarding destination device is made by operating the operating unit 205, MFP101 will receive the user input concerning this setting change. Upon receipt of the user input in this manner, the supervisor 605 determines to change the forwarding destination device, and the process proceeds to Step S1205.

In Step S1205, the supervisor 605 changes the forwarding destination device based on the user input.

The processings of Step S1204 and Step S1205 become effective measures mainly in cascade copy and cascade print. Since the absolute color reproduction range will shrink even if a direction to expand the margin is adjusted, a user-desired output result may not be obtained. In such a case, by selecting another output device having a wider color reproduction range or by decreasing the productivity and removing an output device having a narrow color reproduction range from currently selected devices, more faithful color reproduction is possible.

Next, in Step S908, the supervisor 205 adds the determined color reproduction range to the image data for printing so that the designated color reproduction range of the job can be interpreted in the forwarding destination device. Next, in Step S909, the supervisor 605 performs the transfer of transfer data to the forwarding destination devices MFP102, LBP103, and terminates the process.

By configuring as in this embodiment, it is possible to automatically perform color correction processing between devices optimum for a print image and also to perform color correction processing between devices tailored to the user's preference.

Third Embodiment

In the first embodiment, the processing in the case where an AND area computed by querying each of the forwarding destination devices falls below a threshold value and also the deviation from a document image is severe has not been described yet. However, in such a case, a warning may be displayed to prompt for sample output, and a sample under the current setting may be printed or a sample for each combination of devices is printed as a list, so that a user may confirm the output result in advance and change the setting or the output devices.

Since the basic configuration concerning this embodiment is the same as that of the first embodiment, portions different from the first embodiment will be described using FIG. 13A, FIG. 13B, FIG. 14, and FIG. 15.

FIGS. 13A and 13B show output examples of a sample print in this embodiment.

FIG. 13A is an example of a sample print (print for confirming an image printed under the current setting) for confirming the tint output under the current setting. This sample can be output by operation from a currently operated forwarding source device (MFP101 in this embodiment).

Moreover, FIG. 13B is an example of sample print for each combination of the respective forwarding destination devices, and is for confirming what kind of tint is obtained if a combination of the forwarding destination devices selected under the current setting is changed and output. For example, when three devices A, B, and C are designated to perform cascade copy, the current setting is A&B&C, and other combinations are A&B, A&C, B&C. In cases where the color reproduction range of a particular device is narrow, if a user can recognize in advance how the tint varies when the printing is performed without this device, then failure output can be prevented. The method of changing an output device based on the result of this sample output is as described in the processing of S1204 and Step S1205 in FIG. 12 in the second embodiment.

Figure 14:
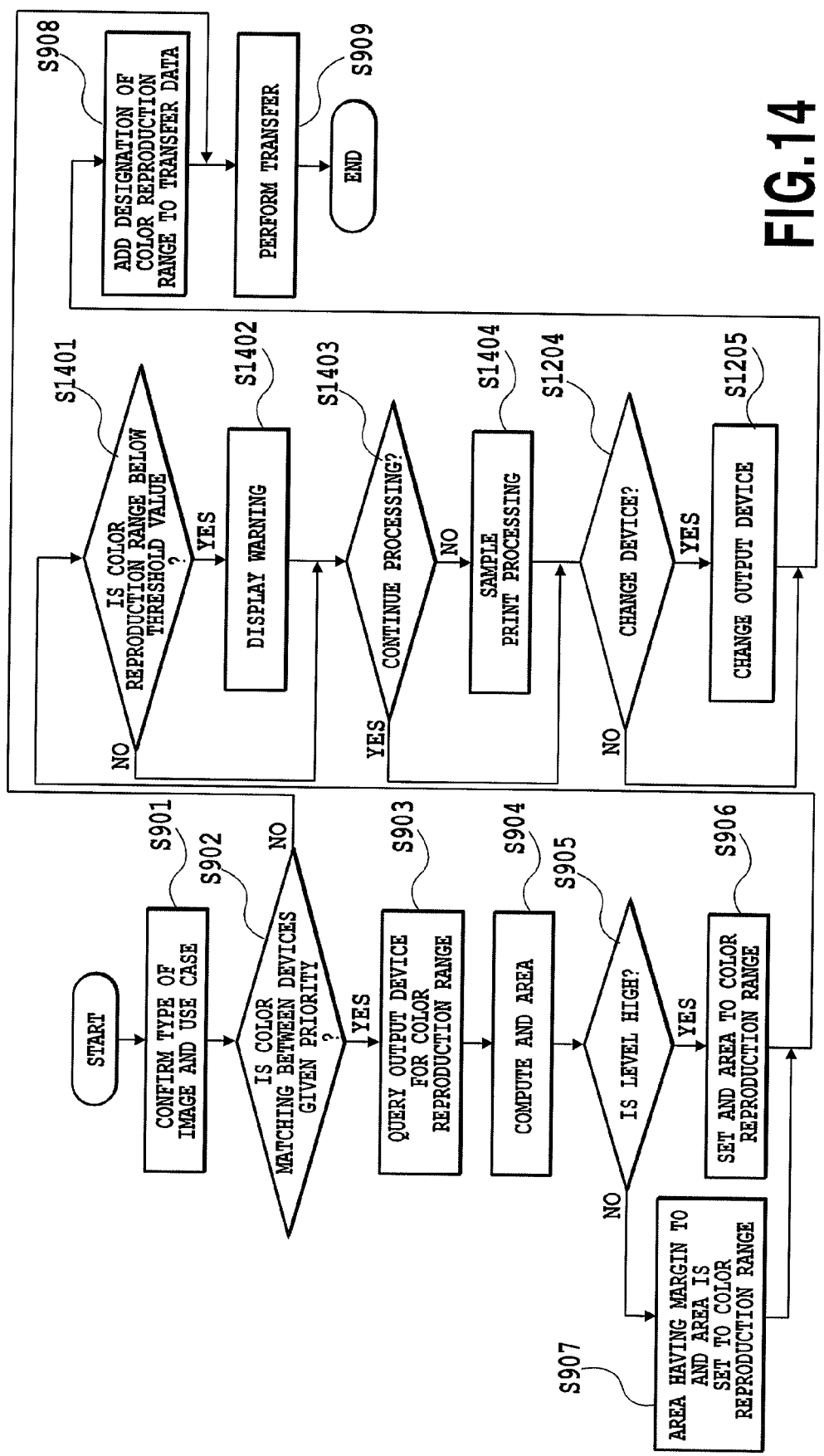
FIG. 14 is a flowchart illustrating software processing of a forwarding source device in the third embodiment of the present invention.

FIG. 14 is a flowchart illustrating software processing of the forwarding source device (MFP101) in this embodiment.

In FIG. 14, when processing of cascade or distribution, or printing one job in a plurality of devices is started, in Step S901 the supervisor 605 confirms the use case and the type of image, and determines a color matching level between devices. The use case can be determined because information is added as an attribute of a job in designating cascade, distribution, or the like in the operating unit 205. The type of image can be determined in the text/photograph determination unit 406 described in FIG. 4 if it is scan data. Moreover, the type of image can be determined from a designated command in interpreting a PDL language if it is PDL data.

Next, in Step S902, if the printing is performed in one device as in remote copy, then the process proceeds to Step S909 and the supervisor 605 performs transfer and then terminates the process. On the other hand, if the printing is performed in a plurality of devices in Step S902, then in Step S903, the supervisor 605 queries all the forwarding destination output devices (MFP102, LBP103) for color reproduction ranges inherent to the respective devices. In Step S904, the supervising manager 605 computes an AND area of the color reproduction ranges of the respective destination devices from the result of Step S903, in the color reproduction range determination unit 407 described in FIG. 4.

Next, in Step S905, the supervisor 605 determines whether the color matching level acquired in Step S901 is high or not. If it is determined as the level=high in accordance with the decision criteria on the color matching level described in FIG. 7, the supervising manager 605 will determine the computed AND area as the color reproduction range (the color reproduction range of the image data for printing) for processing a relevant job (Step S906). If it is determined as the level=middle, the supervising manager 605 will determine the AND area with a margin, which is obtained by giving a margin to the computed AND area, as the color reproduction range (the color reproduction range of the image data for printing) for processing the relevant job (Step S907).

Furthermore, in Step S1401, the supervisor 605 determines whether or not the color reproduction range of the relevant job determined in Step S906 or S907 falls below a threshold value. If it is determined in Step S1401 that the above determined color reproduction range of the relevant job falls below a threshold value, the change in tint may be large, and therefore a warning is displayed in the operating unit 205 (Step S1402) to alert the user.

In Step S1403, the supervisor 605 determines whether or not to continue the processing without performing sample print processing, based on a user input. In this step, the supervisor 605 displays a UI for causing a user to select whether or not to perform sample print, in the operating unit 205. Then, when the user operates the operating unit 205 and inputs an instruction to perform sample print, MFP101 receives this user input, and the supervisor 605 determines to perform sample print, based on this user input, and the process proceeds to Step S1404.

Figure 15:
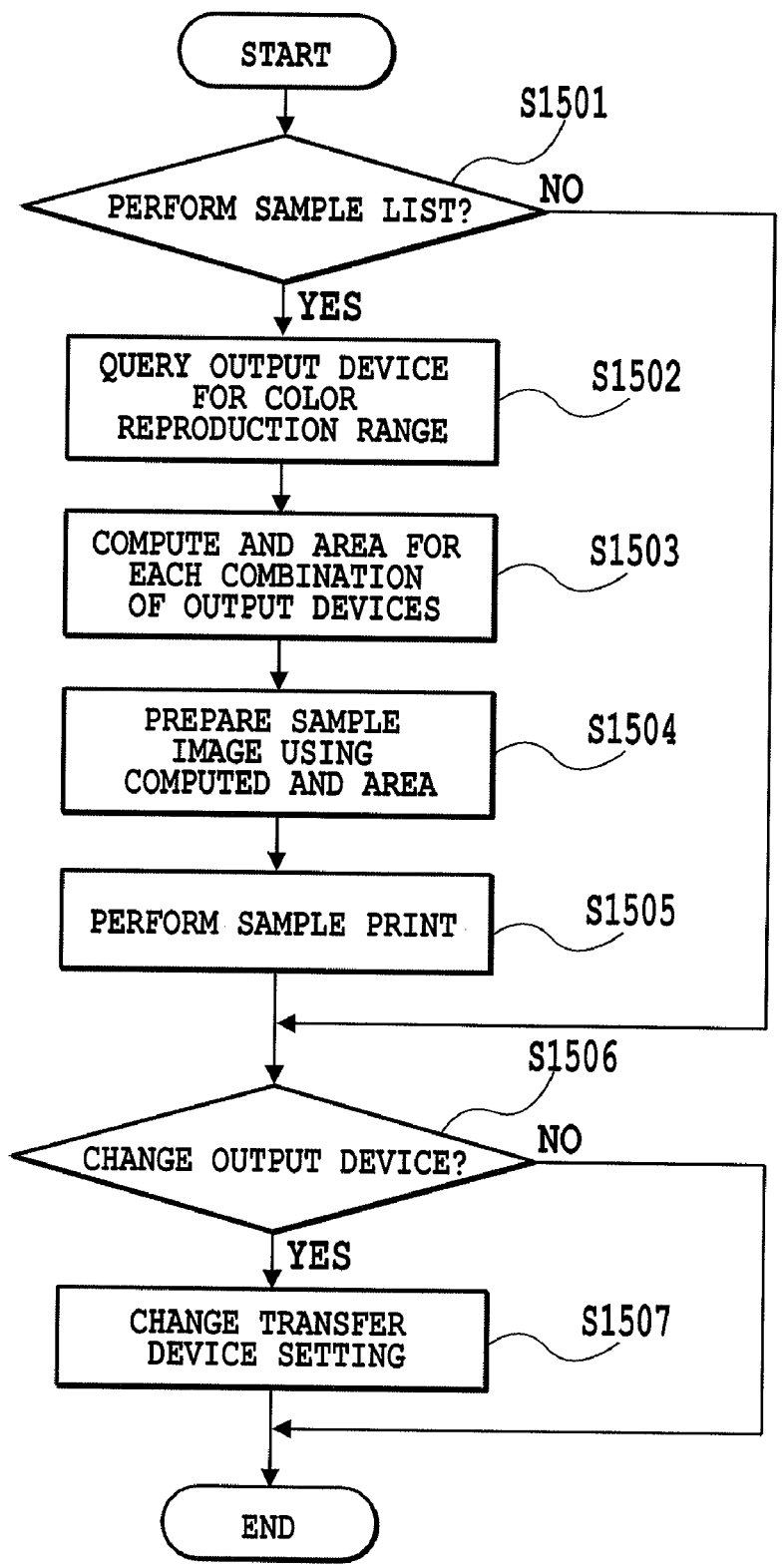
FIG. 15 is a flowchart illustrating sample print processing of a forwarding source device in the third embodiment of the present invention.

As a result of the decision in Step S1403, if the user enters an input to perform sample print and confirm an image, then in Step S1404, the supervisor 605 performs a processing for a user to confirm a sample image in advance, the processing being described in FIG. 15. The sample print processing of Step S1404 is described in detail in FIG. 15.

When a user confirms the sample result output by the sample print processing of Step S1404, the following processing is performed in Step S1204. That is, in Step S1204, the supervisor 605 determines whether or not to change the forwarding destination device as the output device, based on the user input entered via the operating unit 205. That is, the supervisor 605 displays a UI (user interface) for inputting a change of the forwarding destination device in the operating unit 205. In this case, when a setting change of the forwarding destination device is made by operating the operating unit 205, MFP101 will receive a user input concerning this setting change. Upon receipt of the user input in this manner, the supervisor 605 determines to change the forwarding destination device, and the process proceeds to Step S1205.

In Step S1205, the supervisor 605 changes the forwarding destination device based on the user input.

The processings of Step S1204 and Step S1205 become effective measures mainly in cascade copy and cascade print. Since the absolute color reproduction range will shrink even if a direction to expand the margin is adjusted, a user-desired output result may not be obtained. In such a case, by selecting another output device having a wider color reproduction range or by decreasing the productivity and removing an output device having a narrow color reproduction range from currently selected devices, more faithful color reproduction is possible.

On the other hand, when a user does not instruct to perform sample print, the supervisor 605 determines to continue the processing without performing sample print, and the process proceeds to Step S908.

In Step S908, the supervisor 605 adds the determined color reproduction range to the image data for printing so that the designated color reproduction range of the job can be interpreted in the forwarding destination device. Then, in Step S909, the supervisor 605 performs the transfer of transfer data to the forwarding destination devices MFP102, LBP103, and terminates the process.

FIG. 15 is a flowchart illustrating sample print processing of the forwarding source device (MFP101) in this embodiment.

As described above, in FIG. 14, when a color reproduction range (the color reproduction range of the image data for printing) for processing a relevant job falls below a threshold value, a warning is displayed (Step S1402) and accordingly a user may perform sample print.

In Step S1501, the supervisor 605 determines whether or not to perform sample print. If the supervisor 605 determines in Step S1501 that sample print is not performed, the process proceeds to Step S1506. On the other hand, if the supervisor 605 determines that sample print is performed, the process proceeds to Step S1502.

In Step S1502, the supervisor 605 queries the currently set forwarding destination device for the color reproduction range. In this embodiment, since the query for the color reproduction range of the forwarding destination device is already done in Step S903, this step may not be performed. When this step is not performed, the color reproduction range information acquired in Step S903 may be used in the subsequent processing.

In Step S1503, the supervisor 605 computes an AND area of color reproduction ranges for all combinations of forwarding destination devices, in the color reproduction range determination unit 407 described in FIG. 4.

Note that when information designating a forwarding destination device is included in a job to be processed, the supervisor 605 will compute an AND area of color range reproduction ranges for each combination of the above designated forwarding destination devices.

In Step S1504, the supervisor 605 generates a sample image using each of the AND areas computed in Step S1503 (Step S1504). Although not illustrated, as described in FIGS. 13A and B, either of the sample print example (a) and the sample print example (b) may be selected by user setting.

In Step S1505, the supervisor 605 performs sample print based on the sample image generated in step S1504 by the printer unit 203 of the forwarding source device MFP101. In this manner, for example, the samples shown in FIGS. 13A, 13B can be printed. That is, the supervisor 605 can perform sample print for sample images for all the combinations of currently set destination devices. Moreover, if there is a designation of a forwarding destination device by a job as described above, printing of sample images will be performed for the sample images in the case where the above designated destination devices among currently set destination devices are combined.

In Step S1506, the supervisor 605 determines whether or not to change the forwarding destination device, based on the user input. That is, the supervisor 605 displays a UI for causing a user to determine whether to output using a current forwarding destination device or to change the forwarding destination device, in the operating unit 205. The user can view the sample images printed in Step S1505 and select a desired color reproduction. The supervisor 605 associates each of these sample images, which the user observes, with a combination of forwarding destination devices for realizing the color reproduction, and maintains the associated results. Accordingly, just by selecting a user-desired image among the sample images, the supervisor 605 can easily determine a forwarding destination device required for this image. When a user operates the operating unit 205 and inputs an image which the user determined in this manner, MFP101 will receive this user input. The supervisor 605 extracts a device corresponding to the sample image, which the user selected, based on this user input, and if this extracted device is the same as the current forwarding destination device, the supervisor 605 determines that the forwarding destination device will not be changed, and terminates the processing as it is. On the other hand, if the above extracted device differs from the current forwarding destination, the supervisor 605 determines that the forwarding destination device is to be changed, and the process proceeds to Step S1507.

That is, as a result of the user decision, if it is determined in step S1506 that the forwarding destination device is to be changed, then in Step S1507 the supervisor 605 changes the forwarding destination device setting, and terminates the processing.

Note that, when the forwarding destination device is changed in Step S1507, the supervisor 605 extracts an AND area corresponding to the above selected forwarding destination device from the AND areas computed in Step S1503. Then, if it is determined in Step S905 that the color matching level is high, the extracted AND area is set to the color reproduction range of the image data for printing. Moreover, if it is determined in Step S905 that the color matching level is middle, an area, which is obtained by giving a predetermined margin to the above extracted AND area in Step S907, is set to the color reproduction range of the image data for printing.

By configuring as in this embodiment, it is possible to detect beforehand a use case in which a user's unintended correction processing is performed, and to make course correction so as to obtain the user's intended output results, and also to reduce failure outputs. That is, a user can confirm in advance the tint of an image to be produced by currently set forwarding destination devices, by means of sample images before a job is actually processed. If a desired color reproduction has not been performed yet, then among sample images regarding various combinations in forwarding destination device candidates, a combination of forwarding destination devices for realizing the desired color reproduction can be selected. Therefore, in a stage before a job is actually processed, a combination of forwarding destination devices capable of reproducing the user-desired tint can be determined.

That is, according to this embodiment, a user can confirm sample images prior to actual print of a job, and a user can select whether to continue the processing as it is or to change the forwarding destination device. Therefore, in a stage before printing a job, a user can re-select a forwarding destination device or adjust the color reproduction range while confirming the output.

As described above, an important thing in this embodiment is that a user confirms sample images prior to actual print of a job. Accordingly, after acquiring a sample image for each combination in Step S1504, a UI indicative of a relationship between a sample image for each combination of forwarding destination devices and a combination of the forwarding destination devices corresponding to this sample image may be displayed in the operating unit 205. In this case, MFP101 causes a user to select a desired relationship using this UI.

Fourth Embodiment

In the third embodiment, the color range of a job has not been taken into account. However, as a warning display or a trigger for prompting sample output, if an AND area computed by querying each of the forwarding destination devices falls below a threshold value and also falls below the color range of a job, a warning may be displayed to prompt sample output.

By configuring as in this embodiment, not only a change in tint occurring simply from differences in the capabilities of the output devices but the content of a job are included in the decision factors. Therefore, it is possible to increase accuracy in detecting a use case, in which a user's unintended correction processing is performed, and to make course correction so as to obtain user-intended output results, and reduce failure outputs.

Other Embodiments

The present invention can also be applied to a system comprising, for example, a plurality of devices (such as, for example, a computer, an interface device, a reader, and a printer) and to an apparatus (such as a multifunction apparatus, a printer, or a facsimile apparatus) comprising a single device.

The scope of the embodiments also includes a processing method comprising steps of: storing in a storage medium a program for operating the configuration of the above-described embodiments so as to realize the functions of the embodiment; reading the program stored in this storage medium, as a code; and causing a computer to execute this code. That is, computer readable storage media also fall within the scope of the embodiments. Moreover, not only a storage medium, in which the computer program is stored, but also the computer program itself falls within the scope of the embodiments.

As such storage medium, for example, a floppy (registered trademark) disk, a hard disk, an optical disk, a magneto optical disc, a CD-ROM, a magnetic tape, a nonvolatile memory card, and a ROM can be used.

Moreover, not only those executing processing using a single program stored in the storage medium but also those operating on an OS and executing the operations of the embodiments in conjunction with other software or functions of an extension board also fall within the scope of the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-053909, filed Mar. 4, 2008, which is hereby incorporated by reference herein in its entirety.

What is claimed is:

1. An image processing system comprising an image processing apparatus and a plurality of image forming apparatuses, the image processing system constructed such that an identical image is transmitted to the plurality of image forming apparatuses, wherein
the image processing apparatus includes:
an acquiring unit configured to acquire a color reproduction range for each of the plurality of image forming apparatuses;
a computing unit configured to compute a logical AND of the plurality of acquired color reproduction ranges;
a determining unit configured to determine whether a color reproduction range in printing the image is set to the logical AND of the plurality of color reproduction ranges or to an expanded area of the logical AND of the plurality of color reproduction ranges, in accordance with at least one of a use case indicating whether print using the plurality of image forming apparatuses is cascade print or distribution print and an attribute of the image; and
a transmitting unit configured to add the determined color reproduction range to the image and to transmit this to the plurality of image forming apparatuses, and wherein
the image forming apparatus includes:
a generating unit configured to, upon receipt of a request to acquire a color reproduction range inherent to the image forming apparatus from the image processing apparatus, generate the inherent color reproduction range and transmit this for response to the image processing apparatus; and
a printing unit configured to, upon receipt of the image added with the determined color reproduction range from the image processing apparatus, compress the image for printing so as to fall within the determined color reproduction range.

2. The image processing system according to claim 1, wherein the image processing apparatus further includes
a judging unit configured to judge whether or not to make a change of a color reproduction range in printing the image from the color reproduction range inherent to the image forming apparatus to the determined color reproduction range, in accordance with at least one of the use case and the attribute of the image, wherein
if the judging unit judges not to make the change,
the determining unit determines that the color reproduction range in printing the image is set to the color reproduction range inherent to the image forming apparatus,
the transmitting unit transmits the image to the plurality of image forming apparatuses, and
the printing unit prints the image using the color reproduction range inherent to the image forming apparatus.

3. The image processing system according to claim 1, wherein the determining unit,
if an attribute of the image is text, sets a color reproduction range in printing the image to the logical AND of the plurality of color reproduction ranges, and if the attribute of the image is image, sets the color reproduction range in printing the image to the expanded area of the logical AND of the plurality of color reproduction ranges.

4. An image processing apparatus for transmitting an identical image to a plurality of image forming apparatuses, comprising:
an acquiring unit configured to acquire a color reproduction range of each of the plurality of image forming apparatuses from each of the plurality of image forming apparatuses;
a computing unit configured to compute a logical AND of the plurality of acquired color reproduction ranges;
a determining unit configured to determine whether a color reproduction range in printing the image is set to the logical AND of the plurality of color reproduction ranges or to an expanded area of the logical AND of the plurality of color reproduction ranges, in accordance with at least one of a use case of print using the plurality of image forming apparatuses and an attribute of the image; and
a transmitting unit configured to add the determined color reproduction range to the image and to transmit this to the plurality of image forming apparatuses.

5. The image processing apparatus according to claim 4 further comprising:
a judging unit configured to judge whether or not to make a change of a color reproduction range in printing the image from the color reproduction range inherent to the image forming apparatus to the determined color reproduction range, in accordance with at least one of the use case and the attribute of the image, wherein
if the judging unit judges not to make the change,
the determining unit determines that the color reproduction range in printing the image is set to the color reproduction range inherent to the image forming apparatus, and
the transmitting unit transmits the image to the plurality of image forming apparatuses.

6. The image processing apparatus according to claim 4, wherein the determining unit,
if an attribute of the image is text, sets a color reproduction range in printing the image to the logical AND of the plurality of color reproduction ranges, and if the attribute of the image is image, sets the color reproduction range in printing the image to the expanded area of the logical AND of the plurality of color reproduction ranges.

7. The image processing apparatus according to claim 4, further comprising:
a computing unit configured to compute a color range of the image, wherein
when the computed color range is larger than the logical AND of the plurality of color reproduction ranges and also when a color reproduction range in printing the image is set to the expanded area of the logical AND of the plurality of color reproduction ranges, the determining unit sets so that the expanded area may approach the computed color range.

8. The image processing apparatus according to claim 4 further comprising:
an accepting unit configured to accept a user input regarding the expansion of the logical AND of the plurality of color reproduction ranges, wherein
when a color reproduction range in printing the image is set to the expanded area of the logical AND of the plurality of color reproduction ranges, the determining unit changes at least one of a direction to expand the logical AND of the plurality of color reproduction ranges and an expansion width of the logical AND, in accordance with the user input.

9. The image processing apparatus according to claim 4 further comprising:
a second acquiring unit configured to acquire logical AND of color reproduction ranges for each combination of the plurality of image forming apparatuses, based on a color reproduction range of each of the plurality of image forming apparatuses acquired by the acquiring unit;
a printing unit configured to make a print for a user to confirm in advance an image, the image being obtained when a print is made using the acquired logical AND of color reproduction ranges for each combination of the plurality of image forming apparatuses; and
an accepting unit configured to accept a user input indicative of a result of user's confirmation of the print for the user to confirm in advance.

10. The image processing apparatus according to claim 9 further comprising:
a judging unit configured to, based on the user input, judge whether or not to change an image forming apparatus to be a target for printing the image; and
a changing unit configured to, when it is judged that the image forming apparatus to be a target for printing the image is changed, change the image forming apparatus to be a target for printing the image, in the plurality of image forming apparatuses.

11. The image processing apparatus according to claim 9, wherein when among the plurality of image forming apparatuses, an image forming apparatus to be a target for printing the image is designated, the second acquiring unit acquires logical AND of color reproduction ranges for each combination of the designated image forming apparatuses.

12. The image processing apparatus according to claim 4 further comprising:
a second acquiring unit configured to acquire logical AND of color reproduction ranges for each combination of the plurality of image forming apparatuses, based on a color reproduction range of each of the plurality of image forming apparatuses acquired by the acquiring unit;
a displaying unit configured to display a relationship between an image when using the acquired logical AND of color reproduction ranges for each combination of the plurality of image forming apparatuses and a combination of the image forming apparatuses corresponding to this image; and
an accepting unit configured to accept a user input indicative of a relationship selected by a user having confirmed the display.

13. An image processing method for transmitting an identical image to a plurality of image forming apparatuses, the method comprising the steps of:
acquiring a color reproduction range of each of the plurality of image forming apparatuses from each of the plurality of image forming apparatuses;
computing logical AND of the plurality of acquired color reproduction ranges;
determining whether a color reproduction range in printing the image is set to the logical AND of the plurality of color reproduction ranges or to an expanded area of the logical AND of the plurality of color reproduction ranges, in accordance with at least one of a use case indicating whether print using the plurality of image forming apparatuses is cascade print or distribution print and an attribute of the image; and
adding the determined color reproduction range to the image and transmitting this to the plurality of image forming apparatuses.

14. The image processing method according to claim 13 further comprising the step of
judging whether or not to make a change of a color reproduction range in printing the image from the color reproduction range inherent to the image forming apparatus to the determined color reproduction range, in accordance with at least one of the use case and the attribute of the image, wherein
if the judging step judges not to make the change,
the determining step determines that the color reproduction range in printing the image is set to the color reproduction range inherent to the image forming apparatus, and
the transmitting step transmits the image to the plurality of image forming apparatuses.

15. The image processing method according to claim 13, wherein the determining step,
if an attribute of the image is text, sets a color reproduction range in printing the image to the logical AND of the plurality of color reproduction ranges, and if the attribute of the image is image, sets the color reproduction range in printing the image to the expanded area of the logical AND of the plurality of color reproduction ranges.

16. The image processing method according to claim 13 further comprising the step of
computing a color range of the image, wherein
when the computed color range is larger than the logical AND of the plurality of color reproduction ranges and also when a color reproduction range in printing the image is set to the expanded area of the logical AND of the plurality of color reproduction ranges, the determining step sets so that the expanded area may approach the computed color range.

17. The image processing method according to claim 13 further comprising the step of
accepting a user input regarding the expansion of the logical AND of the plurality of color reproduction ranges, wherein
when a color reproduction range in printing the image is set to the expanded area of the logical AND of the plurality of color reproduction ranges, the determining unit changes at least one of a direction to expand the logical AND of the plurality of color reproduction ranges and an expansion width of the logical AND, in accordance with the user input.

18. The image processing method according to claim 13 further comprising the steps of:
   acquiring logical AND of color reproduction ranges for each combination of the plurality of image forming apparatuses, based on a color reproduction range of each of the plurality of image forming apparatuses acquired by the acquiring step;
   making a print for a user to confirm in advance an image, the image being obtained when a print is made using the acquired logical AND of color reproduction ranges for each combination of the plurality of image forming apparatuses; and
   accepting a user input indicative of a result of user's confirmation of the print for the user to confirm in advance.

19. The image processing method according to claim 18 further comprising the steps of:
   judging whether or not to change an image forming apparatus to be a target for printing the image, based on the user input; and
   when it is judged that the image forming apparatus to be a target for printing the image is changed, changing the image forming apparatus to be a target for printing the image, in the plurality of image forming apparatuses.

20. The image processing method according to claim 18, wherein when among the plurality of image forming apparatuses, an image forming apparatus to be a target for printing the image is designated, the step for acquiring the logical AND of color reproduction ranges for each combination of the plurality of image forming apparatuses acquires logical AND of color reproduction ranges for each combination of the designated image forming apparatuses.

21. The image processing method according to claim 13 further comprising the steps of:
   acquiring logical AND of color reproduction ranges for each combination of the plurality of image forming apparatuses, based on a color reproduction range of each of the plurality of image forming apparatuses acquired by the acquiring step;
   displaying a relationship between an image when using the acquired logical AND of color reproduction ranges for each combination of the plurality of image forming apparatuses and a combination of the image forming apparatuses corresponding to this image; and
   accepting a user input indicative of a relationship selected by a user having confirmed the display.

22. A non-transitory computer readable storage medium storing a control program for causing a computer to execute an image processing method in an image processing apparatus to transmit an identical image to a plurality of image forming apparatuses, the method comprising the steps of:
   acquiring a color reproduction range for each of the plurality of image forming apparatuses;
   computing logical AND of the plurality of acquired color reproduction ranges;
   determining whether a color reproduction range in printing the image is set to the logical AND of the plurality of color reproduction ranges or to an expanded area of the logical AND of the plurality of color reproduction ranges, in accordance with at least one of a use case indicating whether print using the plurality of image forming apparatuses is cascade print or distribution print and an attribute of the image; and
   adding the determined color reproduction range to the image and transmitting this to the plurality of image forming apparatuses.

* * * * *